US008181208B1

(12) United States Patent
Elwardani

(10) Patent No.: US 8,181,208 B1
(45) Date of Patent: May 15, 2012

(54) MEDIA SERVER AND NETWORK FOR COAXIAL CABLE SUPPORTING LEGACY SET TOP BOXES

(75) Inventor: Ladd Elwardani, La Jolla, CA (US)

(73) Assignee: Entropic Communications, Inc., San Diego, CA (US)

( * ) Notice: Subject to any disclaimer, the term of this patent is extended or adjusted under 35 U.S.C. 154(b) by 1771 days.

(21) Appl. No.: 10/637,173

(22) Filed: Aug. 7, 2003

Related U.S. Application Data

(60) Provisional application No. 60/401,790, filed on Aug. 7, 2002.

(51) Int. Cl.
*H04N 7/16* (2011.01)
(52) U.S. Cl. ............... 725/82; 725/78; 725/80; 725/81; 725/144
(58) Field of Classification Search .................. 725/118, 725/114, 109, 129, 131, 139, 144, 148, 149, 725/151, 74, 78, 80, 82, 85
See application file for complete search history.

(56) References Cited

U.S. PATENT DOCUMENTS

| | | | | |
|---|---|---|---|---|
| 6,253,238 B1 * | 6/2001 | Lauder et al. | ................. | 709/217 |
| 6,452,923 B1 * | 9/2002 | Gerszberg et al. | ............ | 370/352 |
| 6,523,064 B1 * | 2/2003 | Akatsu et al. | ................. | 709/226 |
| 6,588,017 B1 * | 7/2003 | Calderone | ..................... | 725/120 |
| 6,622,304 B1 * | 9/2003 | Carhart | ........................... | 725/74 |
| 6,622,307 B1 * | 9/2003 | Ho | ................................. | 725/120 |
| 6,889,385 B1 * | 5/2005 | Rakib et al. | .................... | 725/119 |
| 7,386,129 B2 * | 6/2008 | Perlman | ........................ | 380/212 |
| 2002/0026645 A1 * | 2/2002 | Son et al. | ........................ | 725/117 |
| 2002/0166124 A1 * | 11/2002 | Gurantz et al. | ................ | 725/78 |
| 2003/0066082 A1 * | 4/2003 | Kliger et al. | .................... | 725/80 |

* cited by examiner

*Primary Examiner* — James R Sheleheda
*Assistant Examiner* — Anthony Bantamoi
(74) *Attorney, Agent, or Firm* — Bruce W. Greenhaus; Duane Morris LLP

(57) ABSTRACT

A media server located in the home has video processing and storage capability. The media server receives video programming and control data from the cable plant head-end and receives status and control data from set top boxes (STBs). The media server can also receive locally generated video programming. The media server transmits signals that implement head-end functions to set top boxes within the home, including video programming and control data. The media server receives status data from the STBs. A point of entry distribution device provides signal coupling and blocking to allow signals to propagate within the home and to the head-end but block certain signals from leaving the home to maintain isolation. The server communicates to legacy STBs and to new STBs and devices that do not use the legacy waveform. Legacy STBs can communicate with the server or with the cable head-end. New devices can communicate with the server and with each other over the in-home coaxial cable wiring. A network is formed using the in-home coaxial cable wiring.

2 Claims, 31 Drawing Sheets

POE Distribution Device

DIAGRAM: c.LINK To Legacy POE Converter

DIAGRAM: IC For Converting POE Splitter

Fig. 28 POE Distribution Device

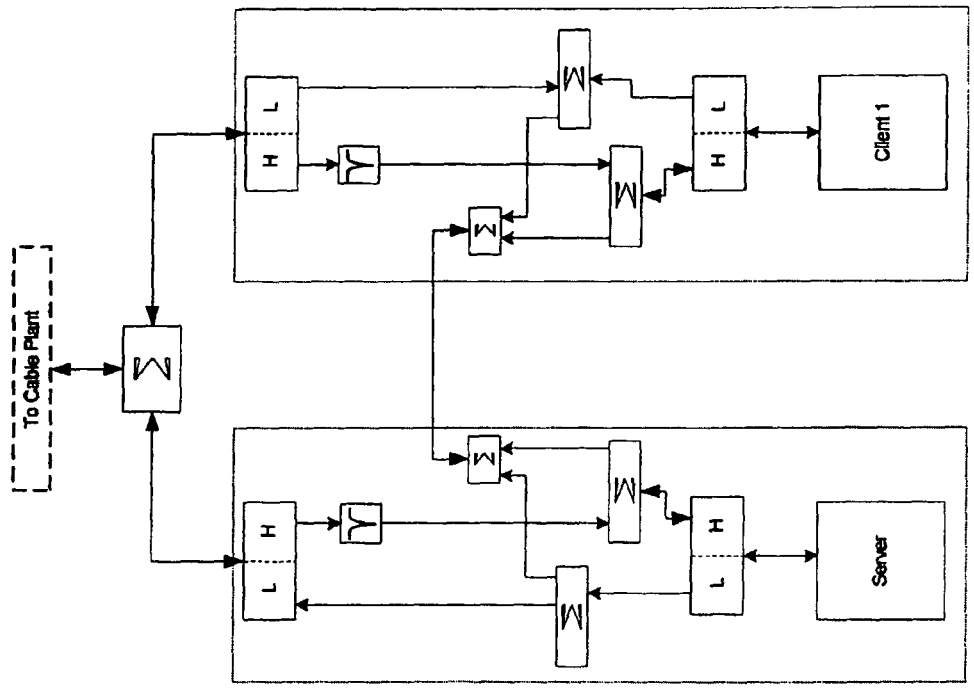
PoE Distribution Device
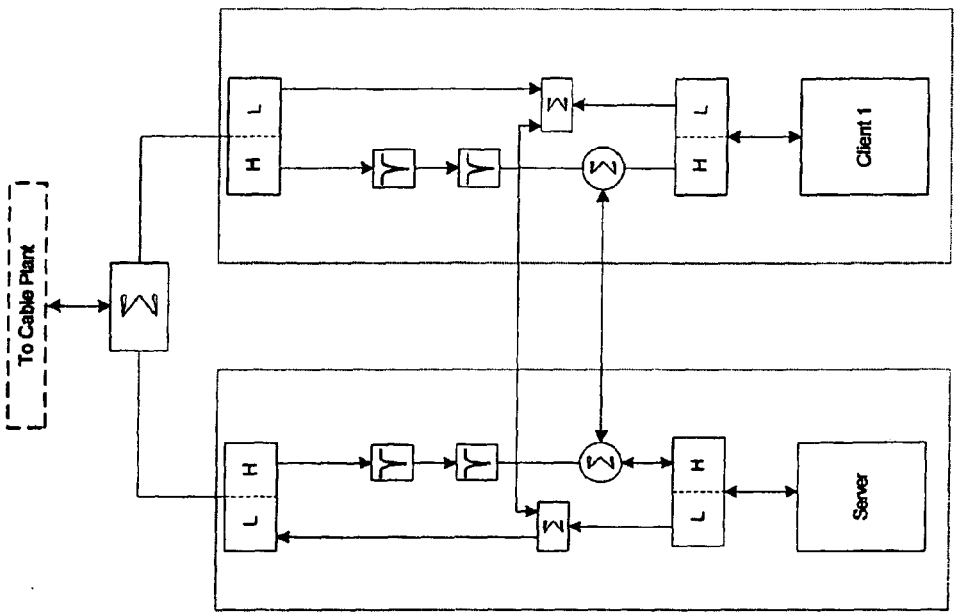
Fig. 29

PoE Distribution Device

MEDIA SERVER AND NETWORK FOR COAXIAL CABLE SUPPORTING LEGACY SET TOP BOXES

RELATED APPLICATIONS

This application claims the benefit of U.S. Provisional Application No. 60/401,790, filed Aug. 7, 2002, entitled "Media Server and Network for Coaxial Cable".

SUMMARY OF THE INVENTION

A media server located in the home has video processing and storage capability. The media server receives video programming and control data from the cable plant head-end and receives status and control data from set top boxes (STBs). The media server transmits signals that implement head-end functions to set top boxes within the home, including video programming and control data. The media server receives status data from the STBs. A point of entry distribution device provides signal coupling and blocking to allow signals to propagate within the home and to the head-end but block certain signals from leaving the home to maintain isolation.

The media server and network operate with legacy STBs already installed in homes or new installations. Alternatively, a converter device, referred to as a dongle, connected to the legacy STBs enables communication with the server using new waveforms.

The media server uses one or more tuners to receive and demodulate video programming information contained in the downstream signals from 54 MHz to 864 MHz. The channels can be analog or digital channels. The received video programs are distributed to STBs over an available channel either above or below the conventional cable band.

The media server contains a demodulator for the 70 to 130 MHz channelized band used for control signaling transmitted by the head-end. The media server also contains a demodulator for the Motorola Aloha compliant 7 to 18 MHz upstream band used by STBs for communication back to the head-end. The server intercepts commands addressed to STBs from the head end and embeds the command data in the video programming data stream. A STB is capable of receiving uplink request acknowledgement over the video program channel.

The server generates an ITU-J83B compliant 64 QAM 6 MHz channel downstream ("Inband") signal within the frequency range of 750-860 MHz in order to be located within an unused channel area and within the operable frequency range of a STB. Other waveforms can be used to transmit the inband signal and are selected for compatibility with the STBs.

The server combines up to 6 video programs into one multiplexed MPEG transport stream with an aggregate data rate of less than approximately 27 Mbps to fit into one 6 MHz digital channel. STBs are addressed to receive the desired video programs from the MPEG stream.

Power control is used to level the signals transmitted by the server and the STBs to prevent overloading of any devices in the home or in the cable plant. Power control can be fixed for a particular installation or adaptive.

The point of entry distribution device is installed to replace the main splitter present in the home cable wiring. The server is connected in one of the wiring branches and can be located in any room that has a cable outlet. The distribution device has frequency selective elements that provide routing of the appropriate frequency bands between the server and client devices while blocking upstream and network signals from entering the cable plant.

The server provides local storage of video programming for use in personal video recording (PVR) and video on demand (VOD) services.

A data network can use the cable wiring by occupying regions of the spectrum not used by cable programming, either in-band at unused channel or out-of-band.

The server can provide local graphics processing and insertion for program guides and other applications. This server function offloads high bandwidth graphics intensive application from wide area cable network, allowing low bandwidth text data to be transmitted to the home. Local insertion also reduces delay associated with data retrieval from the WAN.

The standard cable services and the server network operate independently; therefore, if one service is interrupted the other can still operate.

BRIEF DESCRIPTION OF THE DRAWINGS

FIG. 28 through 31 show block diagrams of several point of entry distribution devices.

DETAILED DESCRIPTION OF THE INVENTION

Figure 1:
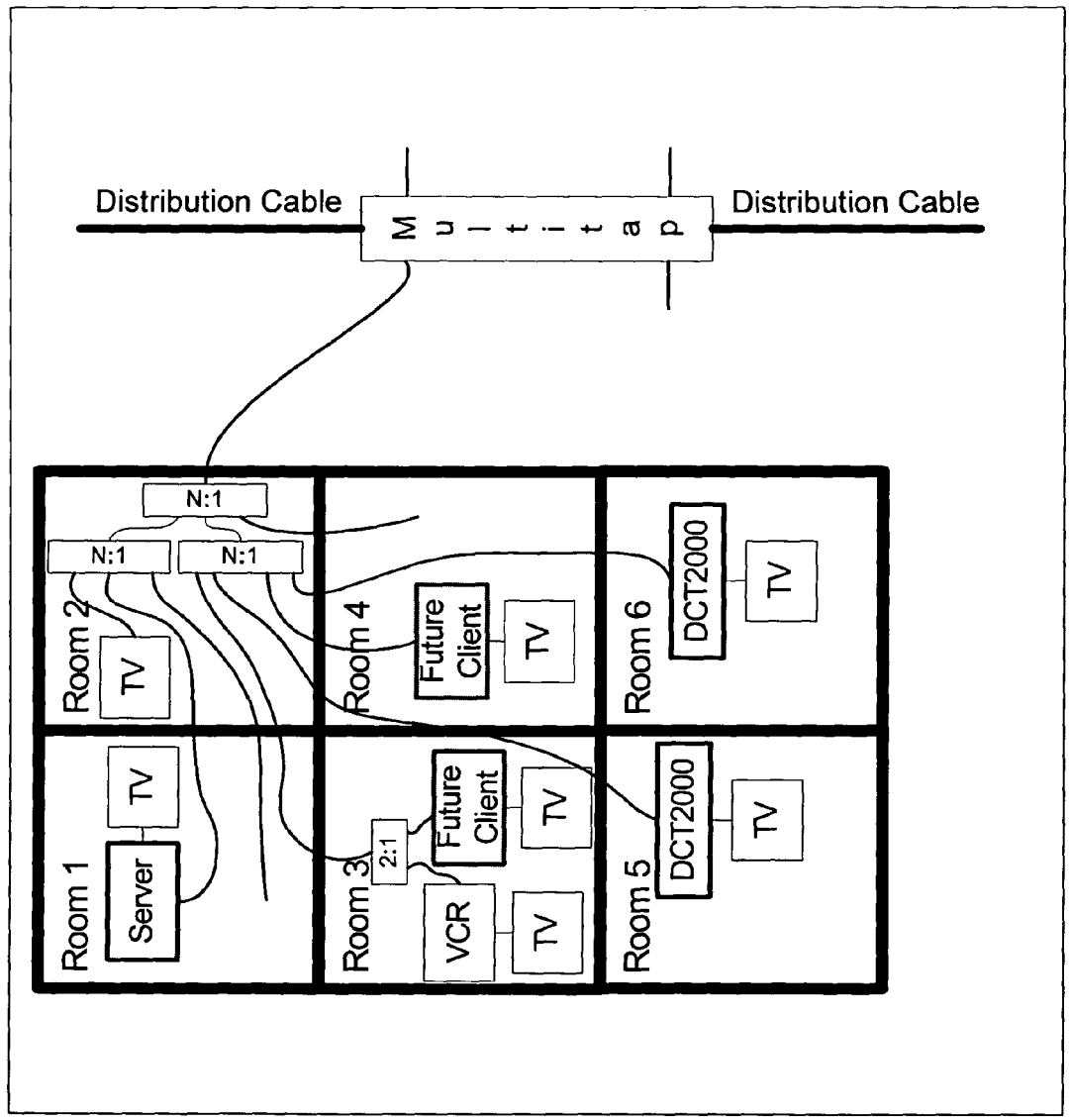
FIG. 1 shows a configuration of a home cable system with a media server, client devices, and other video devices.

FIG. 1 shows a configuration of a home cable system with a media server, client devices, and other video devices. Frequency plans and signaling waveforms are used for illustration and are examples of one embodiment of the invention. Other frequency plans and signaling waveforms can be used and are selected based on the particular cable plant, channel plan, and STBs that are part of the network. For example, instead of the North American NTSC channel spacing of 6 MHz, channel spacing may be 8 MHZ as with a PAL video system common in Europe. Available bandwidths change along with the channel bandwidth.

Introduction

It is desirable to use the more than 20 million fielded STBs as clients to new in-home servers. A server can include multiple tuner-demods, PVR and/or cable modem, and offer high-end services to the existing Set top boxes, (STBs), for example a Motorola STBs. A server may simultaneously operate with new digitally networked clients, as well as cable ready TVs and VCRs. This scenario is shown in FIG. 1.

There are several alternative methods to consider that are described and compared later.

Digital communication between the server and client STBs is described herein using c.Link as an example of a waveform type suitable for use in the invention. Clink uses an OFDM waveform to implement a digital network over in-home coaxial cable, and is further described in co-pending U.S. patent application "Broadband network for coaxial cable using multi-carrier modulation" filed Aug. 29, 2003 Ser. No. 10/230,687, incorporated herein by reference. Additional techniques for communicating over coaxial cable are disclosed in the following co-pending U.S. patent applications, each subject to common assignment as the present application and each incorporated herein by reference: "Broadband network bridging various wiring channels" filed Aug. 9, 2002 Ser. No. 10/215,609; "Network interface and broadband local area network using coaxial cable" filed Jul. 21, 2001 Ser. No. 09/910,412.

Requirements of a Typical System Using the Invention

1. There must be solutions for both "home-run" and "loop" (sometimes called "daisy-chain") cabled homes. See the appendix for a description of home topologies.
2. The solution must support between 1 and 6 STBs per home.
3. The STB must not have any modifications other than upgrading its SW via remote download over the cable system.
4. The solution must only use the RF coax input to the STB and no other input is available (such as an Ethernet port).
5. The STB(s) must continue to receive all of the normal channels and services from 8 to 864 MHz including everything on Aloha upstream, OOB downstream and Inband downstream, as well as provide all of their current features (e.g. head end VOD, digital audio over SPDIF, etc.)
6. The solution must not degrade existing analog and digital services, that are at non-adjacent channels, to any existing customer premise equipment (CPE) including TVs, VCRs, STBs, and other STBs by more than 1 dB in SNR, composite triple beat (CTB), or CSO for SNR=42 dB, CTB=CSO=53 dB. This degradation includes additional loss from any added diplexers or splitters.
7. The solution must not degrade existing analog and digital services, that are at adjacent channels, to any existing CPE including TVs, VCRs, STBs, and other STBs by more than 2 dB in SNR, CTB, or CSO for SNR=42 dB, CTB=CSO=53 dB.
8. The solution must be future-proof by supporting simultaneous STB clients and new direct digitally networked (c.LINK) clients.
9. The solution must support home cabling that causes up to 25 dB for Inband signal attenuation from ground block, or point of entry, to the STB.
10. The solution must support home cabling that causes up to 18 dB of attenuation from ground block, or point of entry, to the Server.
11. The cable plant may have downstream signals from 54 MHz to 864 MHz, which is also the frequency band covered by the STB. If there is an empty 6 MHz channel from the headend between 750 MHz and 860 MHz, then the solution must use it. If there is not an empty channel, then the solution should try to minimize the impact and cannibalization of channels.
12. The cable plant may have upstream signals from 5 to 42 MHz. Typical of STBs, STBs cover 8-12 MHz, 8-17 MHz, or 8-42 MHz depending on generation. The 8 to 17 MHz band must be supported for this solution, and there must be empty spectrum within it where client(s) can use the Aloha upstream to communicate back to the server.
13. The solution may require a professional installer. An easy install, or no install, is desired.
14. The solution may elect not to use the out of band (OOB) between server and clients. All monitor and control functions may be done through the Inband (e.g. program guide, authentication messages, etc.).
15. Aloha upstream messages sent from client to server may propagate all the way to the head end. The headend must ignore them.
16. The solution must generate an ITU-J83B compliant 64 QAM 6 MHz channel downstream ("Inband") signal within the frequency range of 750-860 MHz in order to be located within an unused channel at the STB.
17. The solution must receive a Motorola Aloha compliant upstream within the frequency range of 8-17 MHz, from the STBs.
18. All signal attributes at the STB input must be compliant with STB specifications. This includes levels, frequency accuracy, etc.
19. The in-home distribution must not increase the channel change time by more than 100 msec.
20. A single Inband channel may be used to communicate with up to 6 STBs. This assumes, for digital in-home distribution, that the server has done a re-mux to combine the up to 6 programs into one MPEG transport stream, and that the aggregate data rate, even during 6 simultaneous fast forwards, does not exceed 27.XX Mbps.
21. A single Aloha-upstream channel may be used for the up to 6 STBs to communicate with the server.
22. The client-server Aloha upstream power level at the POE must not exceed the level of the normal upstream signal back to the headend so that it does not overload the upstream laser or headend demod. The normal Aloha upstream signal power is 24 to 60 dBmV at the transmitter output and >10 dBmV at the POE. With an additional 4 to 18 dB attenuation from POE to server, and power control from server to client so that the client can send a different power level to the server than back to the headend, the server must accept an Aloha upstream input level of −8 to +15 dBmV.
23. The downstream video when below 860 MHz, analog or digital, from the server must not exceed −38 dBmV at the POE, so that servers do not interfere with other homes. If power control is used at the server, then the requirement can be reduced to −32 dBmV.

Figure 2:
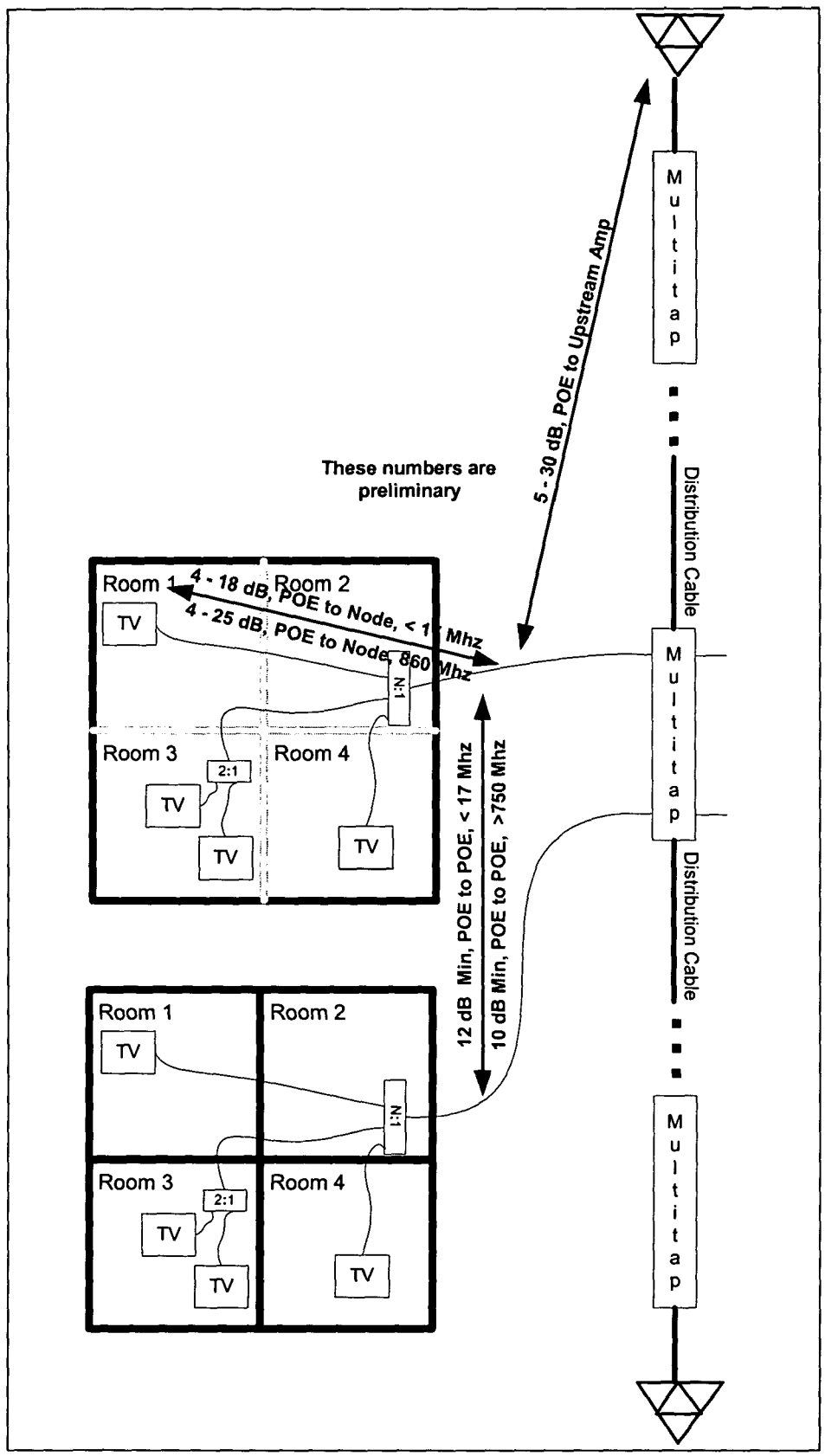
FIG. 2 shows the connection of two homes to a multi-tap port in the cable plant and the potential interaction of signals between homes.

FIG. 2 shows the connection of two homes to a multi-tap port in the cable plant and the potential interaction of signals between homes.

4) Alternative Methods

There are many approaches to distributing multi-media and control between the server and clients in the home. These include both analog and digital methods.

Client-Server Usage: Impact on Interference Models

These methods must be considered with new perspective. This is no longer a headend broadcast usage model. For the first time the home is a source of Inband frequency signals (server to client) and a receiver of Aloha Upstream frequency signals (client to server). Reverse isolation of splitters and micro-reflections (echoes) no longer result simply in echoes of a broadcast signal to neighboring homes, but in interference.

Downstream Interference

While echoes can be as high as −10 dBC, depending on delay, Inband interference should be approximately −53 dBC for 0 dBmV analog signals and −38 dBC for digital signals. An example of digital and analog interference budgets are given in the following table. This shows that the solution must include an additional 28 dB of isolation at the POE for digital downstream frequencies and 37 dB for analog downstream frequencies. It can be assumed that all channels up near 860 MHz are digital and therefore the required POE isolation is 28 dB.

| Inband Frequency Range Parameter | Digital | Analog | |
|---|---|---|---|
| Multitap Output | 12 | 18 | dBmV |
| Drop Attenuation | 0 | 0 | dB |
| POE Input Level | 12 | 18 | dBmV |
| Home Attenuation POE to Node | 25 | NA | dB |
| Node Input Level | −13 | NA | dBmV |
| Server Tx Level At POE | 12 | 12 | dBmV |
| Multitap Reverse Attenuation | 10 | 10 | dB |
| Server Tx Level At Multitap Output To Neighbor | 2 | 2 | dBmV |
| Neighbor C/I | 10 | 16 | dB |
| Degradation Acceptable | 0.5 | 0.5 | |
| C/I Required | 38 | 53 | dB |
| Isolation required at POE | 28 | 37 | dB |

Upstream Interference

Client-Server Aloha upstream signaling will leak backwards through multi-taps and interfere at neighbor's server demodulators (demods). There are two approaches to solve this: (a) isolation to prevent neighbors from interfering with each other, (b) let the neighbors interfere and rely on the Aloha protocol to retransmit upon collisions, as well as filter out signaling for other homes.

Only homes on the same multi-tap will cause collisions. With an 8-port multi-tap, a reasonable worst-case number of co-active clients could be 20. If there is a peak period when these clients are issuing commands averaging every 2 seconds, and a command taking 2 msec on the wire, then the probability of no collisions is 80%. An example of an Aloha upstream interference budget is given in the following table. This shows that the solution either needs 13 dB of upstream isolation at the POE, or else client-server communications should expect collisions. In actuality, Aloha Upstream receivers can successfully demodulate with input levels as low as −32 dBmV so that neighboring homes can potentially false trigger unless the isolation in increased to 30 dB. If enough clients transmit simultaneously, the upstream fiber optic cable laser driver could be overloaded. If an active POE device is used, then the isolation can be included. Otherwise, the simplest solution is to assume collisions and false detections since the Aloha protocol will eventually overcome them through address filtering and retransmission.

| Aloha Upstream Frequency Range Parameter | Digital | |
|---|---|---|
| POE Level | 10 | dBmV |
| Drop Attenuation | 0 | dB |
| Home Attenuation POE to Node | 18 | dB |
| Node Input Level | −8 | dBmV |
| Client Tx Level At POE | 10 | dBmV |
| Multitap Reverse Attenuation | 12 | dB |
| Client Tx Level At Multitap Output To Neighbor | −2 | dBmV |
| Neighbor C/I | 12 | dB |
| Degradation Acceptable | 0.5 | |
| C/I Required | 25 | dB |
| Isolation required at POE for C/I | 13 | dB |
| Minimum Level At Rx For Demodulation | −32 | dBmV |
| Isolation Required At POE For No False Alarms | 30 | dB | c.LINK Reflector

The purpose of a reflector is to keep the energy within a house and not allow signals >860 MHz to leak onto the coax backbone. This is not required for c.LINK operation, and is a multi service operator (MSO) choice.

Figure 3:
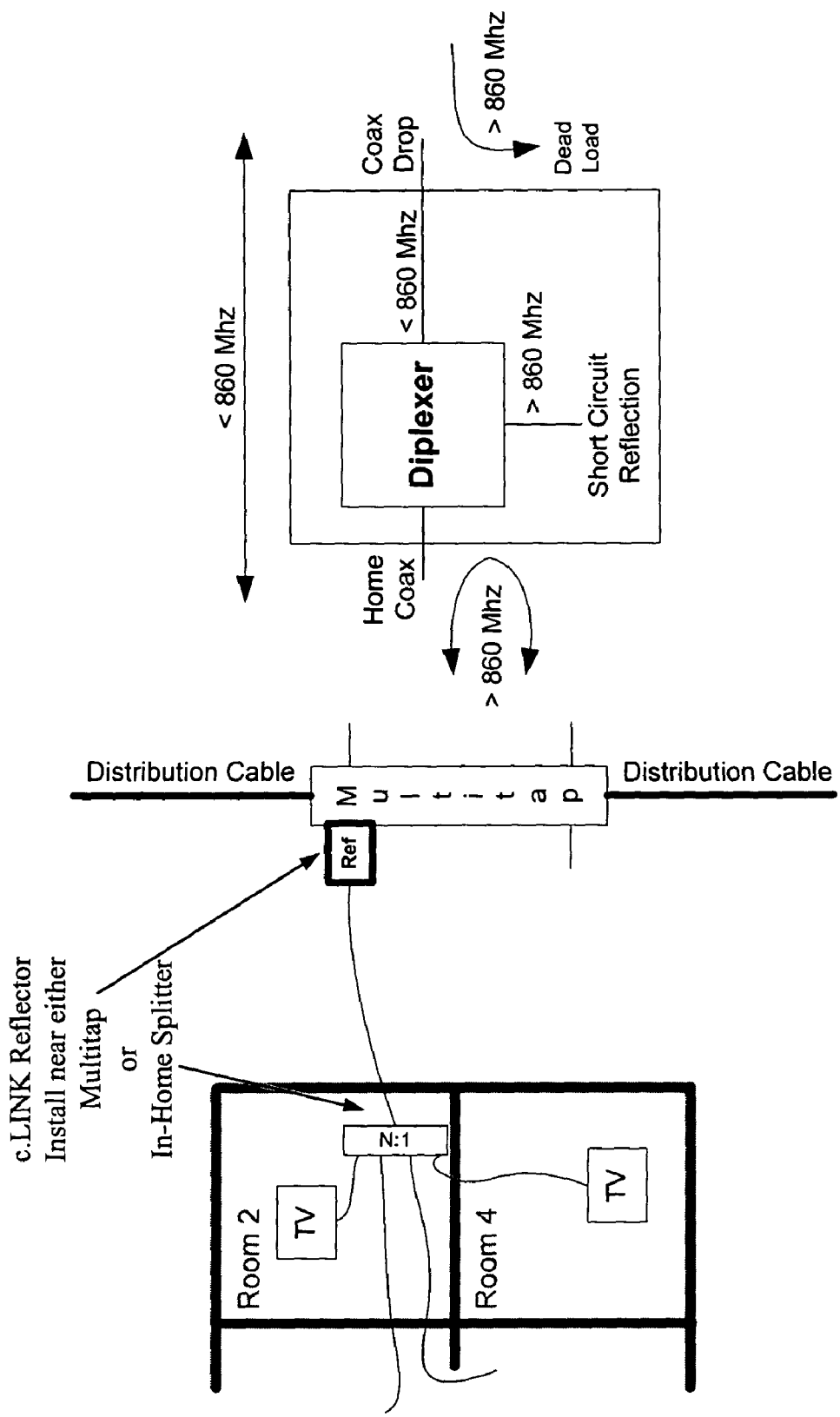
FIG. 3 shows a reflector for reflecting and isolating signals originating within the home.

FIG. 3 shows a reflector for reflecting and isolating signals originating within the home.

Methods Other Than c.LINK

Analog waveforms, and digital waveforms other than c.LINK, cannot ubiquitously go backwards through splitters. These other methods therefore require modifications to the existing cabling and/or splitters in the home. The approaches for analog and digital distribution are different, and each approach has different implications.

Analog and digital waveforms (other than c.LINK) must use at minimum one of the following approaches:

Install new cabling back to POE

Replace the POE splitter with, or install at the POE, a powered device

Figure 4:
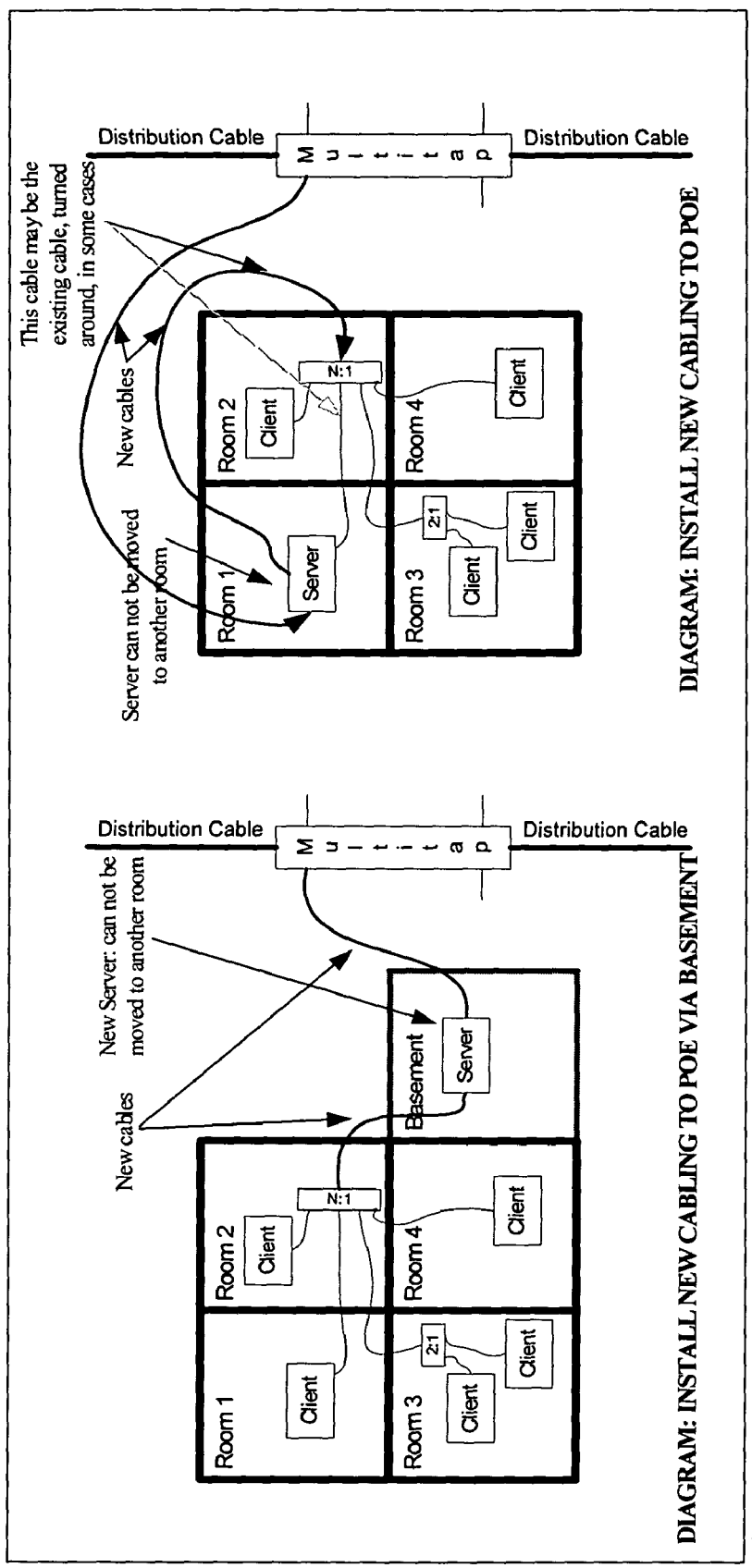
FIGS. 4, 5, and 6 show alternative block diagrams for cable wiring within the home.
Figure 5:
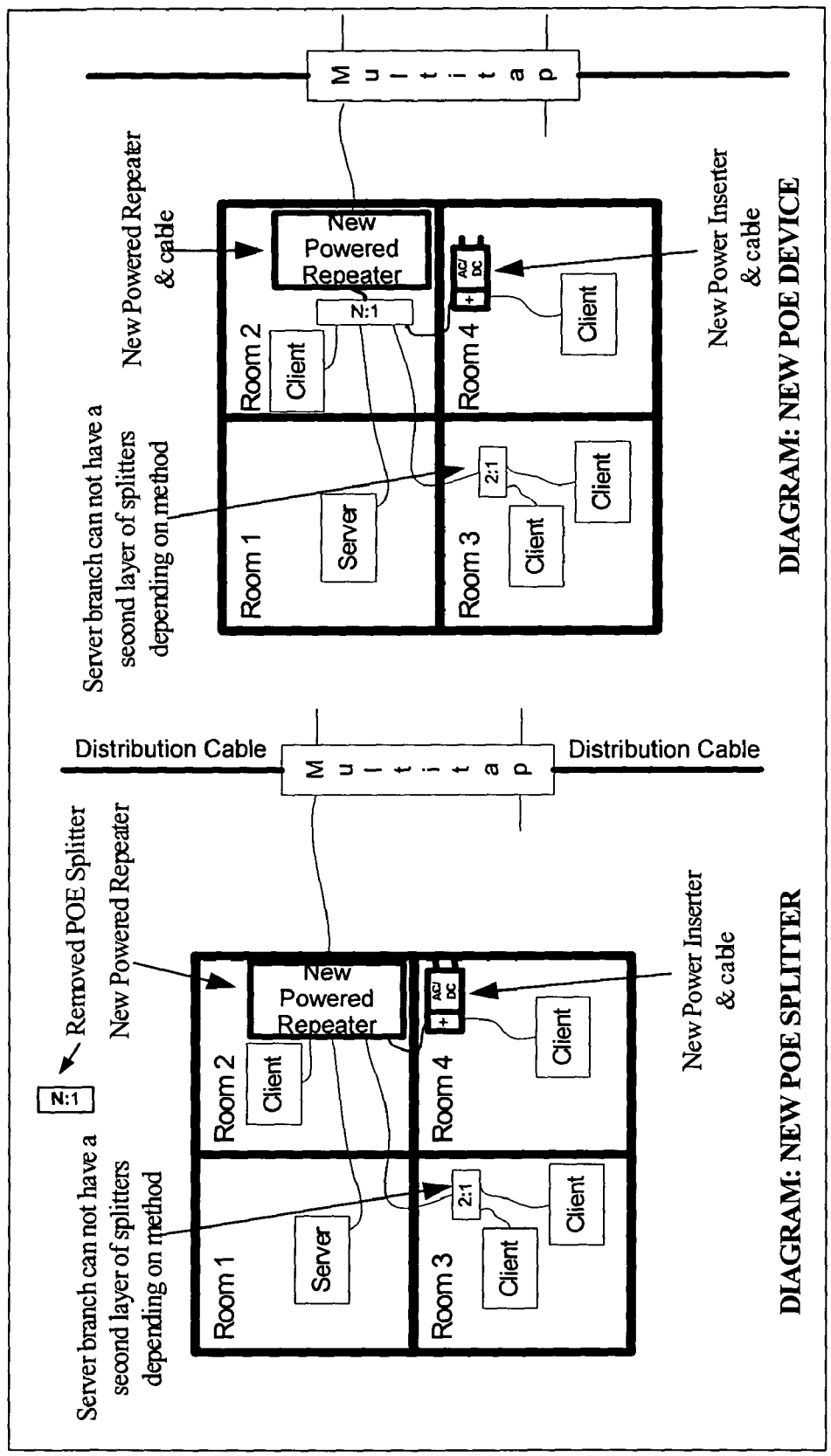
Figure 6:
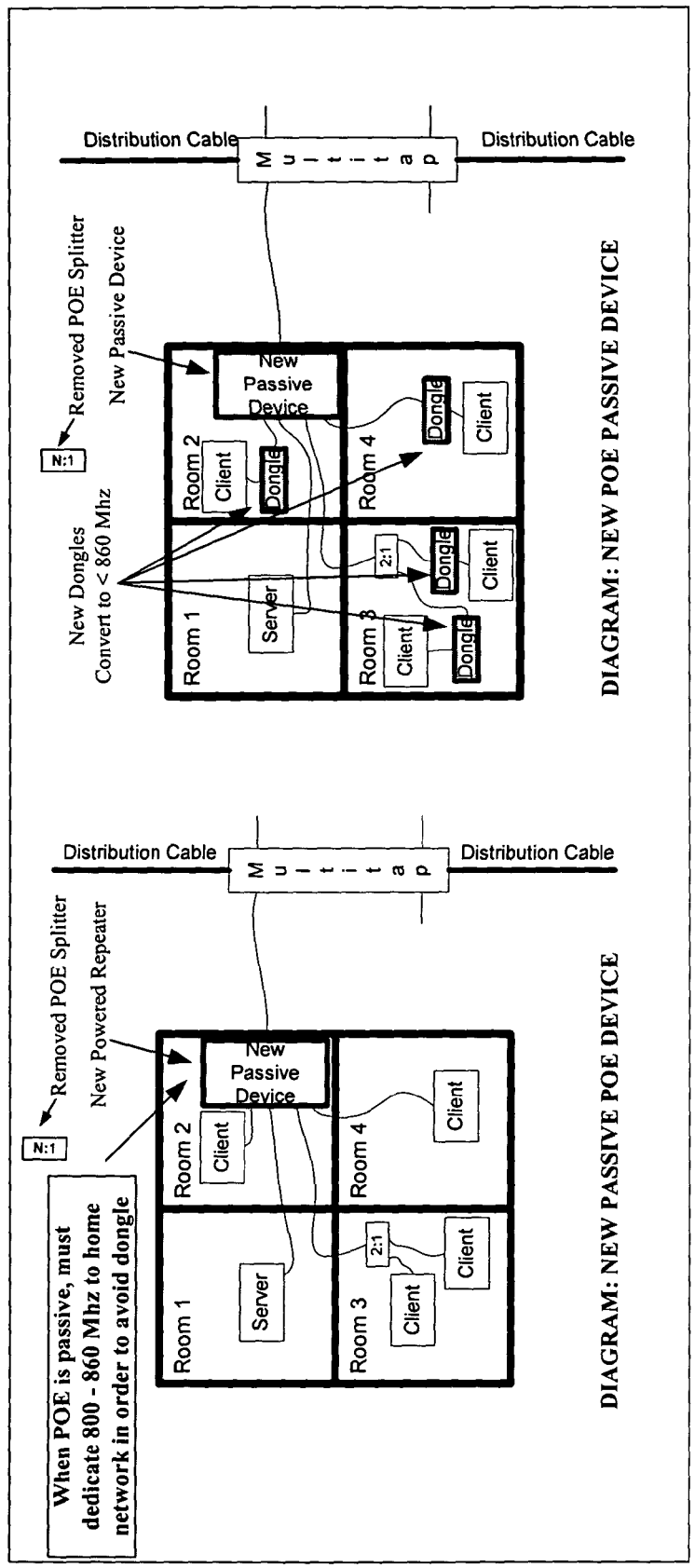

Replace the POE splitter with, or install near the POE, a new passive device. Also add a dongle at the client Reserve the 750-860 MHz band for in-home distribution. Replace the POE splitter with, or install near the POE, a new passive device FIGS. 4, 5, and 6 show alternative block diagrams for cable wiring within the home.

Methods Considered not Viable

There are many other alternative methods that were considered which do not make sense for various reasons. Some similar, but non-viable ones are shown in the following diagram.

For example, the server signal cannot simply be summed into the drop cable. A "stub repeater" cannot be used, in order to simplify installation. Interference levels to neighboring homes, as discussed in other sections, would be too high. A POE that converts from c.LINK to Legacy is not cost competitive or necessary to distribute Legacy around the home, and so is not considered viable.

Figure 7:
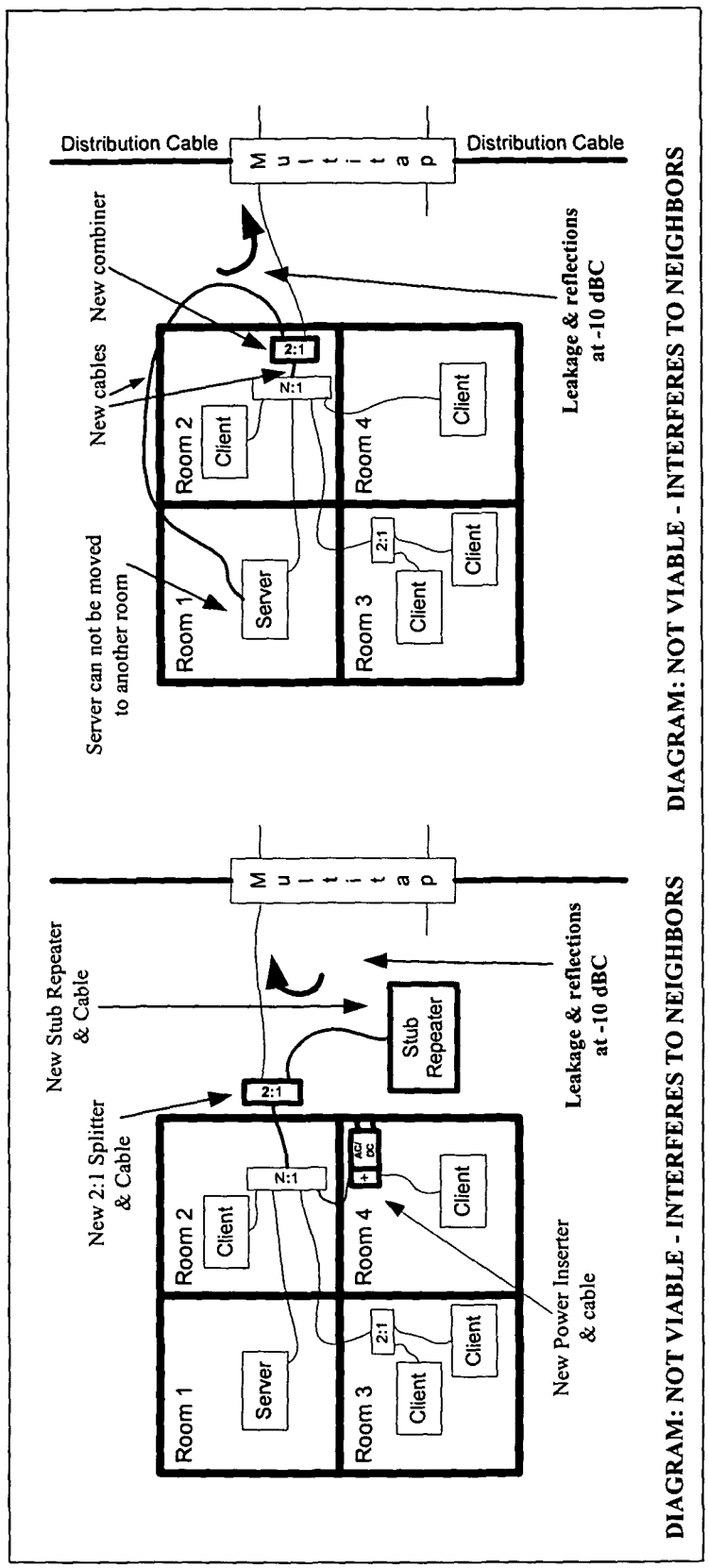
FIGS. 7 and 8 show undesirable configuration of a home network configuration.
Figure 8:
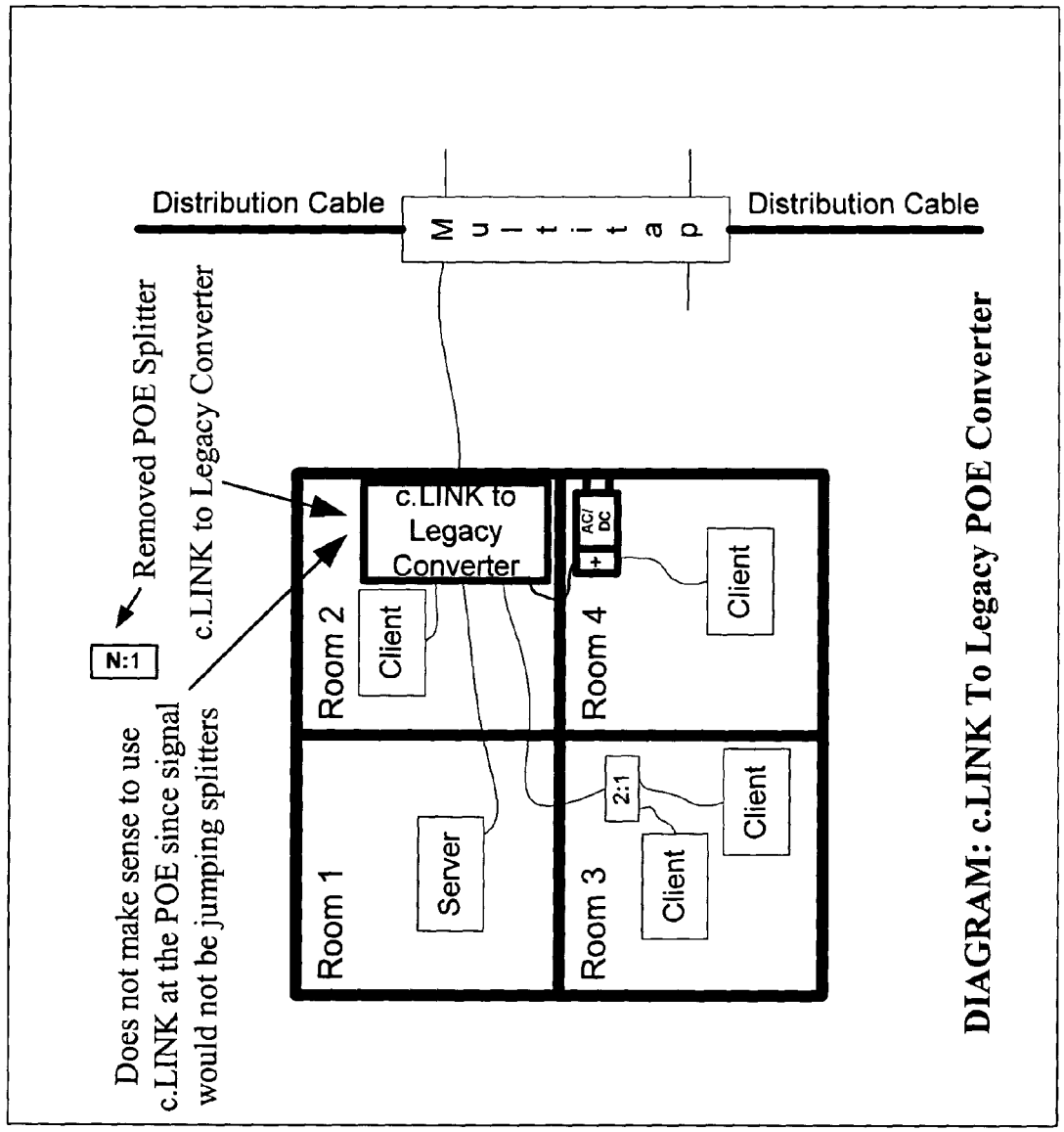

FIGS. 7 and 8 show undesirable configurations of a home network configuration.

Decision Flow Chart of Alternative Methods

Figure 9:
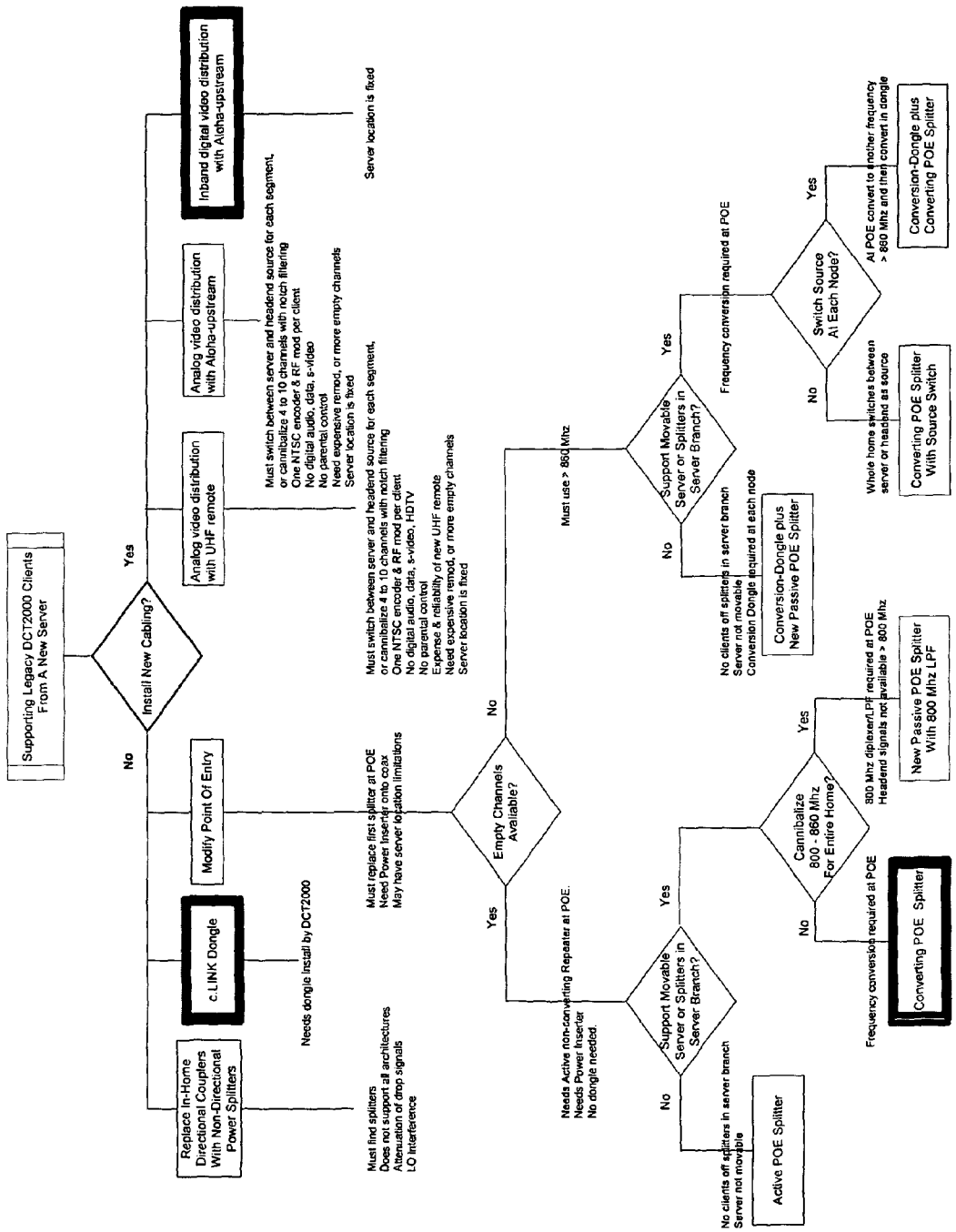
FIG. 9 shows a decision flow chart for selecting alternate methods of configuring the network.

There are at least 6 main alternative approaches as shown in the flow chart of FIG. 9. Although some may be considered clearly less desirable, they are included for completeness.

The key decision points for in-home distribution are:
- Installation of a new cable back to the POE
- Availability of unused channels from headend in 750-860 MHz
- Replacement of the POE splitter
- Ability to move server or have clients in server branch
- Analog or digital distribution These decision points are discussed in the following sections.

The 3 preferred solutions, highlighted with red bordering, are
- New cabling with digital distribution
- c.LINK Dongle
- Converting POE splitter The advantages and disadvantages of these 3 solutions are discussed in other sections.

FIG. 9 shows a decision flow chart for selecting alternate methods of configuring the network.

New Cable Installation to POE

A key decision and differentiator between alternatives is whether new cables must be installed from the server back to the POE. Any new cable install to the server may be problematic for the installer, or un-desirable to the subscriber, for many reasons such as:
- Server may be located at an interior wall, within a high-end home that does not want visible cables or holes
- Installation time could be significantly increased, as compared to no cable installation
- Server can not be moved later to a different location in the house, without another install
    - Subscriber can not move the server from living room to master bedroom, but server may be only source of HDTV, Dolby 5.1, or cable modem data The new cabling effectively turns the server into a mini-headend and the signals from the server are going through splitters in the normal direction for which both analog and standard digital waveforms are functional. Therefore, the server to client communication can be analog video or digital Inband MPEG.

Figure 10:
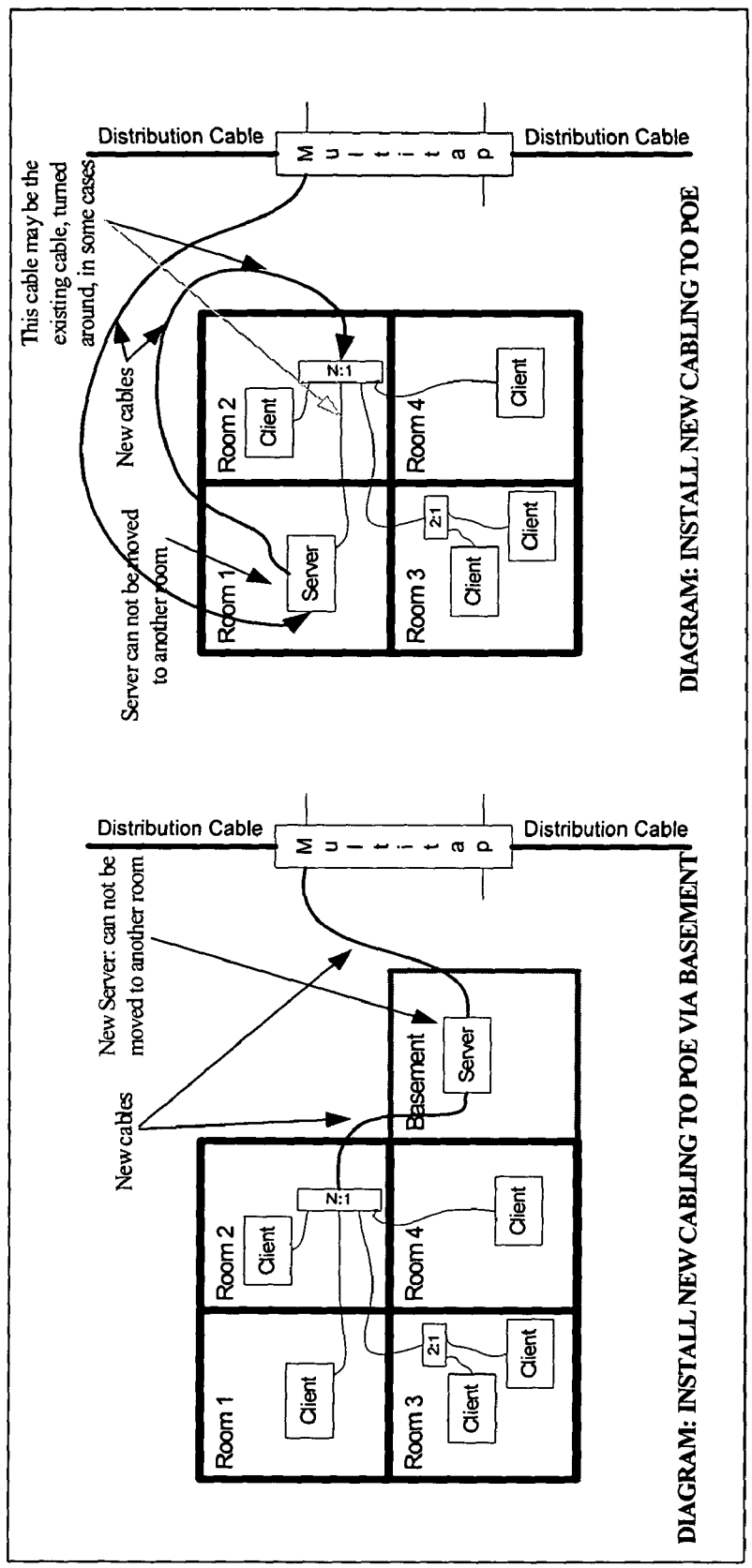
FIG. 10 shows installations where new wiring has been added to connect to the server.

There are two methods for new cabling to the POE:
- Server in basement/closet
- Server at TV FIG. 10 shows installations where new wiring has been added to connect to the server.

Basement Server

A server in the basement requires two new cable runs. It also requires a basement, which many homes, in California for example, do not have. If digital in-home distribution is used then this adds the cost of an additional box that is not driving a TV, and so is a far more expensive solution for the whole house. If analog distribution is used then there are no boxes in the other rooms, so there is not that cost adder. Thus, a basement server can make sense for analog in-home distribution, but not for digital in-home distribution.

Server at TV

A server in the first TV room may be limited to only one new cable install, instead of two, if the existing cable from the node to the POE splitter is found and all splitters in that branch are turned around. Saving the second cable install has customer adoption issues since the customer can easily defeat the solution by adding splitters or reversing a splitter that appears to be in backwards.

Empty Channels

If the in-home cabling is to be used for home networking between the server and STB client(s), then there should be a downstream channel(s) available between 750 and 860 MHz where no signal is being transmitted from the headend. It is impractical, in a home, to make an empty channel by dropping and inserting a single 6 MHz channel. Void of an empty headend channel, there are 3 possible solutions:
- Cannibalize 6 to 10 channels with notch filtering, or 800-860 MHz
    - If multiple analog channels are transmitted then more expensive remodulators may be required or else more channels cannibalized.
- Switch at POE, for whole house, between headend or server as source. Server <860 MHz.
- Switch at a dongle, at each client, between headend or server as source. Server >860 MHz.

Empty Upstream Channels

The Aloha Upstream will very likely also use a new unused channel between 8 and 17 MHz, otherwise the headend would need to deal with the many potential bursts that are for in-home use only, including scheduling/polling so that there are not collisions. Headend coordination of in home communications is impractical since there can be many homes transmitting at the same time between clients and servers. The additional power from home's client-server Aloha upstream communications must not overload the upstream laser. If 100 homes hit a PVR command at the same time, for example at the start of a commercial on a popular TV station, the level will spike 20 dB higher than nominal level.

Figure 11:
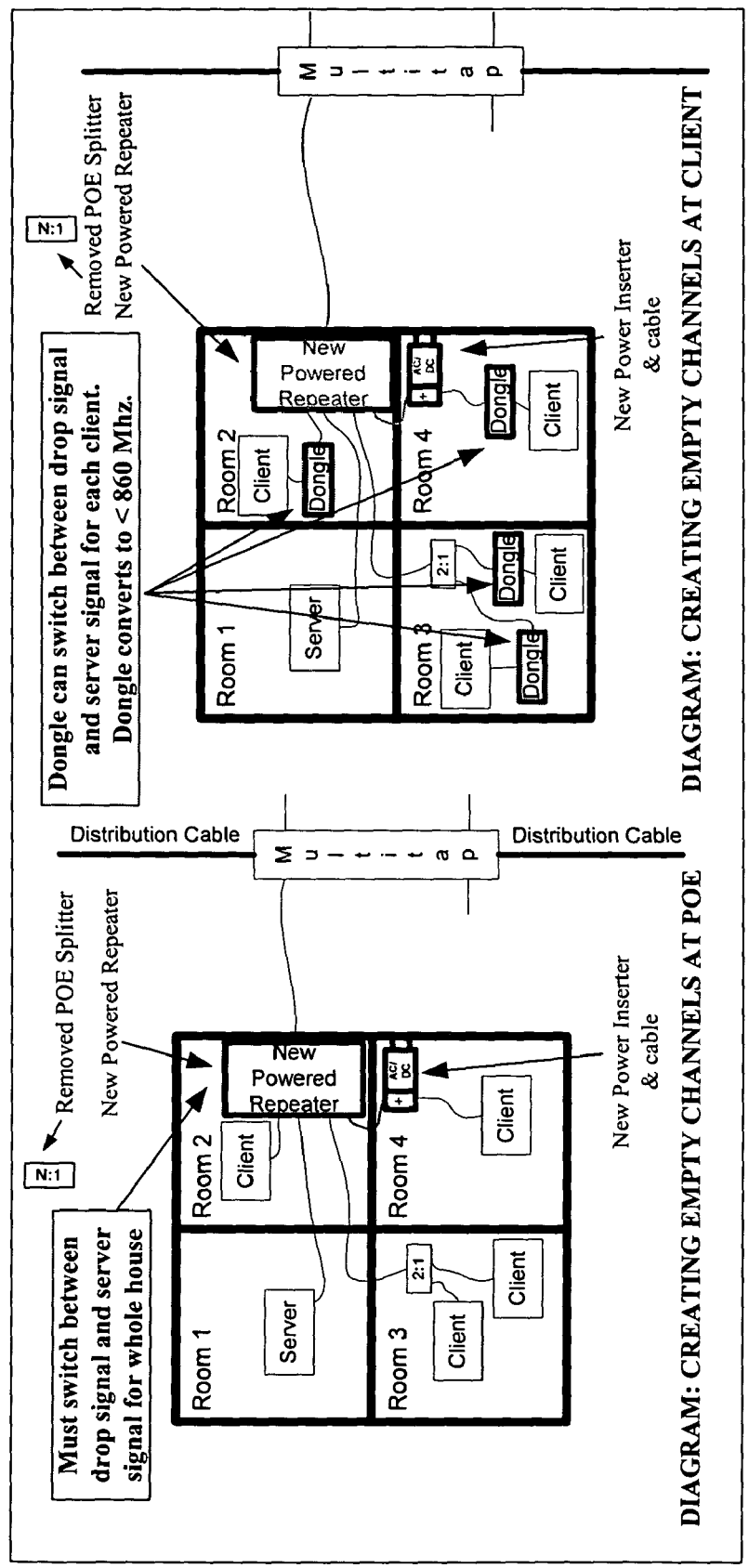
FIG. 11 shows a network configuration for creating empty channel space in the spectrum.

FIG. 11 shows a network configuration for creating empty channel space in the spectrum.

POE Splitter Replacement

An installer must find the first splitter at the POE and replace it with a new device. If it is an active device, then it requires being powered by an AC-DC converter off the customer premises 110VAC and being coupled onto the coax. The new splitter can be either a frequency-converting repeater or non-converting repeater depending on selection of approach. The following table shows a comparison of the four possible solutions for POE Splitter Replacements. This includes whether the POE splitter is active or passive and uses above or below 860 MHz. The table indicates
- Dongle need
- Server mobility (can it be moved to any room)
- If splitters and clients are allowed in the branch from the POE that the server is on
- How leakage to neighbors is solved
- Implications to downstream and upstream

| ◇ 860 | Active | POE Solution | Dongle | Srvr Mobile | Srvr Subsplit | Leakage | Down | Up |
|---|---|---|---|---|---|---|---|---|
| > | A | Dn:Amp/ Diplex/Split & Mix/PLL Up:Split Power inserter | No | Yes | Yes | Up & Dn amps | High quality up & do amps, equivalent to drop amp. AGC auto level out, but complicated or | Upstream amp provides isolation from neighbor. Plenty of power so just send passively from client to server. |

| 860 | Active | POE Solution | Dongle | Srvr Mobile | Srvr Subsplit | Leakage | Down | Up |
|---|---|---|---|---|---|---|---|---|
| | | | | | | | defeated by other signals. Power cntrl from srvr-POE communication possible but complicated and more expensive. Power inserter is a single point of failure for all cable services in home. | |
| < | A | Dn:Amp/ Diplex/Split Up:Split Power inserter | No | No | No | Up & Dn amps | Same issues as above (>860, A) | Upstream amp provides isolation from neighbor. Plenty of power so just send passively from client to server. |
| > | P | Dn: Triplex/Split Up: UHF remote or Split) | Yes | Yes | No | Dn has triplexer filtering. Up has interference and relies on Aloha protocol | Must Tx up to 35 dBmV to meet worst case in-home attenuation. Must do server power control of Legacy downstream by feedback from client. Otherwise power level can be too large for client to receive as well as degrade analog channels from front end overload. | No up isolation to neighbor. Must use UHF remote, or rely on Aloha protocol to overcome collisions. Aloha Upstream at the server must receive to very low levels ~-8 dBmV. |
| < | P | No practical solution | NA | NA | NA | Dn is dead. Up has problem | No practical solution. Neighbor gets extreme interference. | No up isolation to neighbor. Must use UHF remote, or rely on Aloha protocol to overcome collisions. |

The active and >860 MHz solution is clearly preferred, however more expensive than the others. If an active POE splitter is going to be used then it should be the converting one. The passive and <860 MHz option does not have a practical solution.

The active and >860 MHz solution is clearly preferred, however more expensive than the others. If an active POE splitter is going to be used then it should be the converting one. The passive and <860 MHz option does not have a practical solution.

Server Movable, Clients in Server Branch

For the server to be movable, there are two requirements:
No new cable to a dedicated server location
Frequency converting POE device For there to be clients in the server branch, there is the following requirement:
Frequency converting POE device Therefore, a movable server will also allow clients to be in all branches of the home. In other words, clients and the server can go anywhere in the home. This seems to make all other options undesirable. This option is highlighted in the decision flow chart.

Analog Versus Digital Methods

Any practical analog in-home distribution method precludes the use of digital services being shared between the server and clients. This includes
High definition TV
Digital audio (Dolby 5.1, SPDIF, etc.)
Data (IP, etc.)
Parental control
S-video quality (signal must practically be sent as composite RF)

All of these services are supported if digital in-home distribution is selected instead.

Analog in-home distribution, between server and clients, cannot go backwards through splitters and therefore requires that at least one new cable be installed, or a more complicated new POE device. Analog video is 20 dB more sensitive than digital Inband to SNR, distortion and interference, and therefore requires higher performance devices.

Analog in-home distribution, between server and clients, requires a 6 MHz channel for each client, whereas digital distribution can use one 6 MHz through server remuxing. Analog requires that the headend reserve enough empty channels for homes with multiple clients, or else the homes will practically be forced to use frequency converting dongles at each client in addition to a POE device.

Analog remods, that convert NTSC up to UHF, normally output a signal that puts substantial energy into close adjacent channels in order to reduce cost. With analog cannibalization, either more expensive remods are required, or else more 6 MHz channels must be cannibalized. With digital distribution only one 6 MHz channel is needed since the server remuxes the videos destined for clients into one MPEG stream.

Alternative Methods for Server to STB Client Multi-Media Distribution

Analog Video Distribution with UHF Remote (with New Cabling)

With a dedicated cable(s) to the server, the downstream analog video traverses the splitters in the normal direction from clients to server and the clients will receive an acceptable signal. However, this has the issues as discussed above.

The back channel from the clients to the server is only the UHF remote. No Aloha upstream is used. There is potential for operational problems with multiple UHF remotes in a household due to interference. This interference, for example when someone is laying on a metal frame bed, or interference between multiple UHF remotes, has been seen by operators. No Aloha-upstream or out of band downstream are needed.

Analog Video Distribution with Aloha Upstream (with New Cabling)

This is the same as the above case, except that the UHF remote is not needed. The standard STB IR remote is used and the Aloha-upstream communicates remote control from clients to the server. With a dedicated cable to the server, the Aloha upstream traverses the splitters in the normal direction from clients to server and the server will receive an acceptable signal. There needs to be a separate Aloha upstream channel dedicated to in-home client-server communications as described in sections above.

Inband Digital Video Distribution with Aloha Upstream (with New Cabling)

With a dedicated cable to the server, the downstream and upstream traverses the splitters in the normal direction between clients and server and so clients and server will receive an acceptable signal. However, this has the issues as discussed above.

The server outputs Inband digital video for all clients in the house. This has the advantages over the analog distribution as described above. The Aloha-upstream is used for communicating standard STB IR remote control back to the server, as described above.

Non-Directional Power Splitters

The devices typically called "splitters" in the home are actually directional couplers. They are designed to isolate outputs and only pass signal energy from input to outputs. A non-directional power splitter allows all outputs to pass signal between each other. This ensures a reliable signal coupling between all outputs instead of an unknown reverse isolation of 8 to 45 dB between directional coupler outputs. If non-directional power splitters were put throughout the home, then the home would not need to communicate backward through directional couplers and would have a predictable attenuation.

Figure 12:
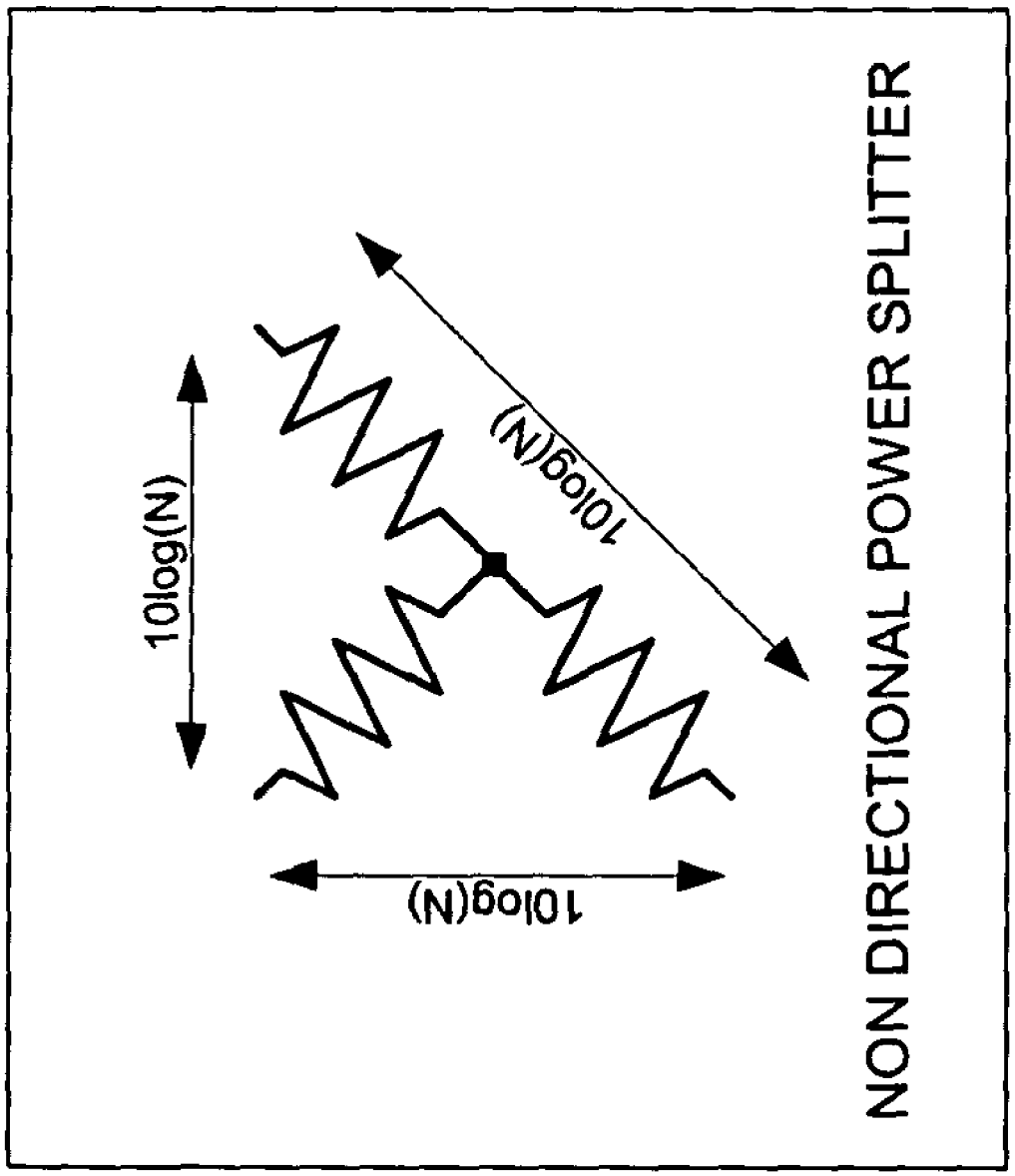
FIG. 12 shows a non-directional power splitter.

FIG. 12 shows a non-directional power splitter.

However, homes with single conversion tuners rely on directional couplers to attenuate tuner LOs so that they does not interfere with other TVs and VCRs in the home. The following table shows an interference budget. Tone interference should be at least −53 dBC and is preferred to be −57 dBC. Non-directional power splitters are shown not to be an option.

| | | |
|---|---|---|
| Typical Analog Input Level At Node | 3 | dBmV |
| LO Leakage form tuner | −30 | dBmV |
| Typical Reverse Attenuation of Splitter | −20 | dB |
| LO Leakage at Node With Directional Couplers | −50 | dBmV |
| C/I at Node With Directional Couplers | 53 | dB |
| Non-Directional Power Splitter Attenuation | 6 | dB |
| LO Leakage at Node With Power Splitters | −36 | dBmV |
| C/I at Node With Power Splitters | 39 | dB |

Modify Point of Entry (No New Cables)

There are many methods for modifying the POE. The decisions between these methods are shown in the flow chart of FIG. 9 and table above. The MSOs will always provide an empty channel between 750 to 860 MHz that can be used for in-home distribution. Even though the cases for when there is not an empty channel available are shown in the flow chart, they are not discussed here. Therefore, the preferred choices discussed here are:

Active POE splitter
New passive POE splitter that cannibalizes 800-860 MHz
New converting active POE splitter Active POE Splitter (No New Cables)

Figure 13:
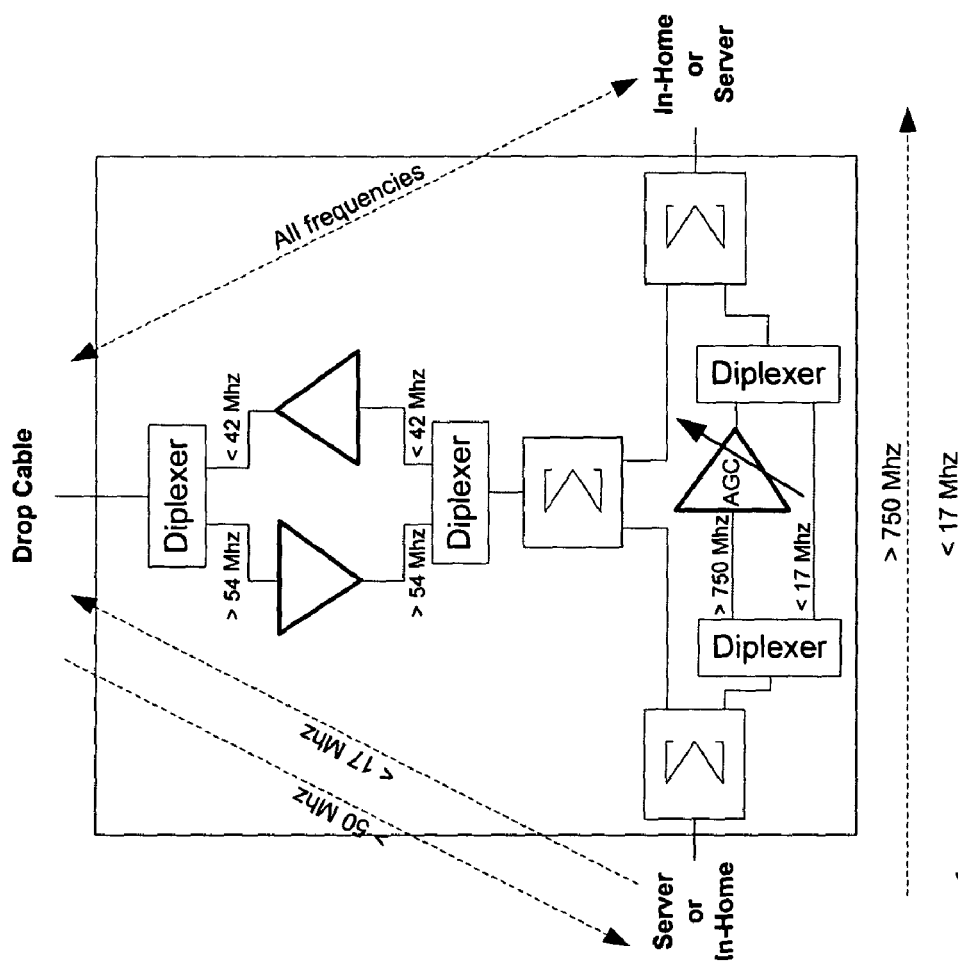
FIG. 13 shows an active point of entry power splitter.

FIG. 13 shows an active point of entry power splitter. The <42 MHz amplifier prevents interference to neighbors of the in-home client to server Aloha upstream signal. The >54 MHz amplifier prevents interference from the neighbor's in-home Legacy downstream. Diplexers split and combine these bands.

The amplifier between the server and client is self-leveling to make sure that the output of the amplifier stays at +10 dBmV so that it can support attenuation of 25 dB from POE to node. A more reliable solution for AGC leveling would include a simple RF communications channels between the server and POE splitter. The Aloha upstream communication from client to server is not amplified since:

17 MHz has very little attenuation through coax
The waveform is a simple 256 Kbps QPSK and therefore does not require much power New Passive POE Splitter, Cannibalizing 800-860 MHz (No New Cables)

Figure 14:
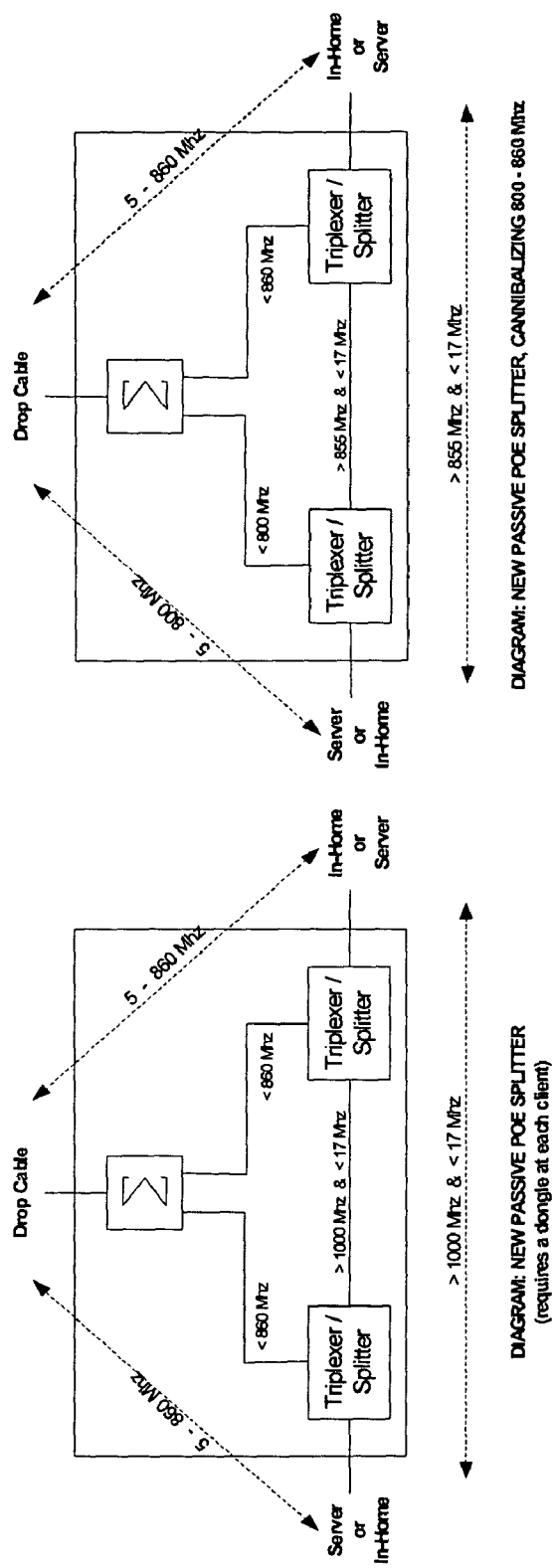
FIG. 14 shows alternative passive point of entry passive power slitters.

FIG. 14 shows two approaches to passive point of entry passive power slitters, when cannibalizing channels and when not.

The server downstream output is above 1000 MHz. The non-cannibalizing POE splitter would require a frequency converting dongle at each client. If a dongle were to be used, then it might as well be a dongle method that eliminates the need for a new POE splitter so that the solution is not so complicated. On the other hand, the cannibalizing dongle takes away ~6 to 10 of the MSOs channels. Neither approach is a very attractive approach compared to other methods.

The triplexer prevents the server Inband downstream signal from leaking back out of the home and interfering with neighbors. The Aloha upstream signals are passed out the house as well as from client to server. Neither signal is amplified. The Aloha upstream is below 17 MHz and so gets very little attenuation through the in-home cabling. The Inband downstream can have attenuation of up to 50 dB and therefore must be transmitted at levels up to +35 dBmV. This precludes having splitters and devices in the coax branch that the server is on since the devices off these splitters would be degraded by too large of signal power. Inband Tx power control must be performed with feedback from the client. This power control poses many issues and some risks.

The Inband attenuation from server to client can be as much as 50 dB, and therefore requires a server transmit level of up to 35 dBmV if using a passive POE device. This is too much power within a 6 MHz channel signal, whether above 860 MHz or below, and can degrade TVs or other devices. If there are not splitters with other devices in the server branch, then power control can ensure this remains at reasonable levels. The client can send back information as to what power level it is receiving and the server can adjust its power so that beyond the POE device its level is consistent with adjacent channel levels.

Converting Active POE Splitter (No New Cables)

Figure 15:
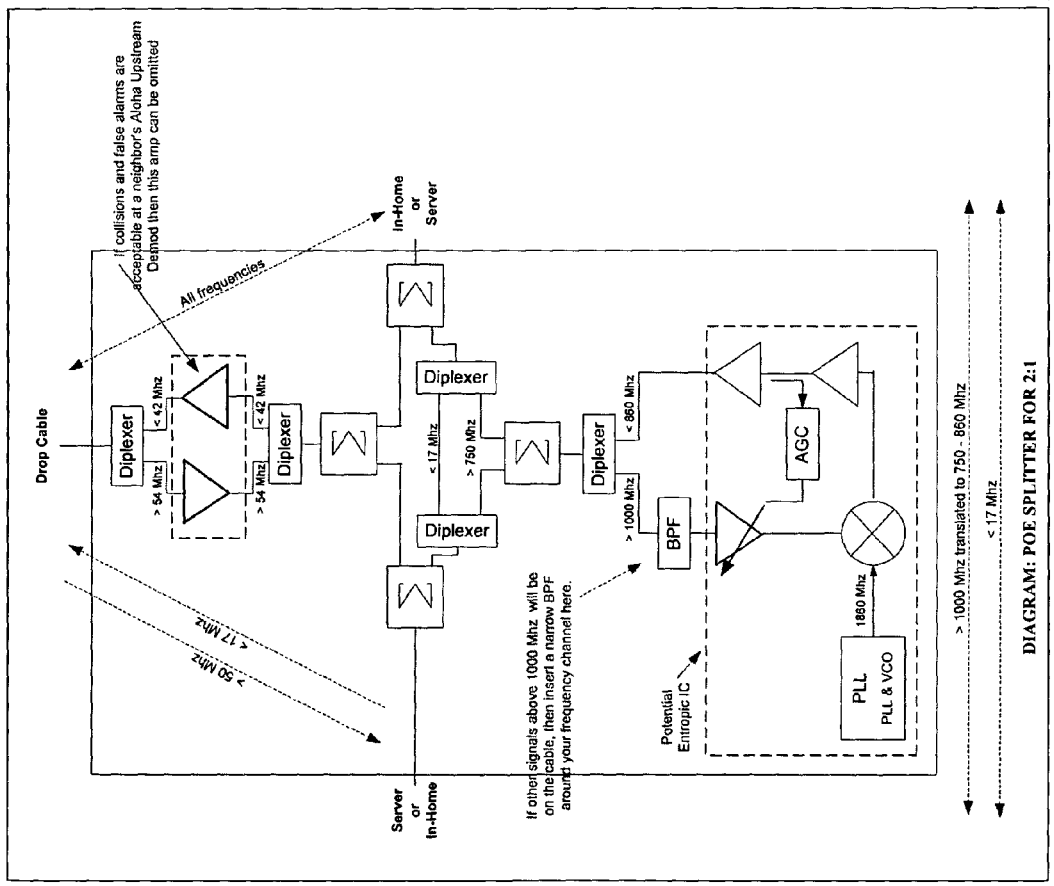
FIG. 15 shows a frequency converting active point of entry power splitter.

FIG. 15 shows a frequency converting active point of entry power splitter.

The signal is sent from the server to the client above 1000 MHz. The POE Splitter converts it to the 750-860 MHz band. High side injection causes spectral inversion so the server should do spectral inversion to offset this.

The <42 MHz amplifier prevents interference to neighbors of the in-home client to server Aloha upstream signal. The >54 MHz amplifier prevents interference from the neighbor's in-home Legacy downstream. The diplexers split and combine the two bands. There is a self-leveling amplifier for the server's Inband transmission to the client making the converted output level at the POE stay at +10 dBmV so that it can support attenuation of 25 dB from POE to node. A more reliable solution for automatic gain control (AGC) leveling would include a simple RF communications channels between the server and POE splitter, as well as feedback from the client as to what level it is receiving. Since this POE device includes frequency conversion, the server can monitor the power of its own converted signal and determine the attenuation in the server coax branch. Since there is frequency conversion in the POE splitter, the converter signal can be put back down the server branch so that splitters and devices in the server branch will work on the server's Legacy network. The device is symmetric so that the server can be moved anywhere in the house.

c.LINK to Legacy Dongle (No New Cables, No POE Splitter Change)

c.LINK can simultaneously carry both the Inband downstream and Aloha Upstream bursts. With c.LINK in the server, any client can transceive the Legacy signal from a dongle. The dongle converts from c.LINK to Legacy and its implementation is shown below. A c.LINK dongle can serve more than one Legacy client, as shown in the diagram below. Each dongle can be powered with a standard wall mount power supply or a wall mount supply can insert power onto the coax for all dongles to use. The dongle simply has two coax connectors and the subscriber can install it in either direction.

Figure 16:
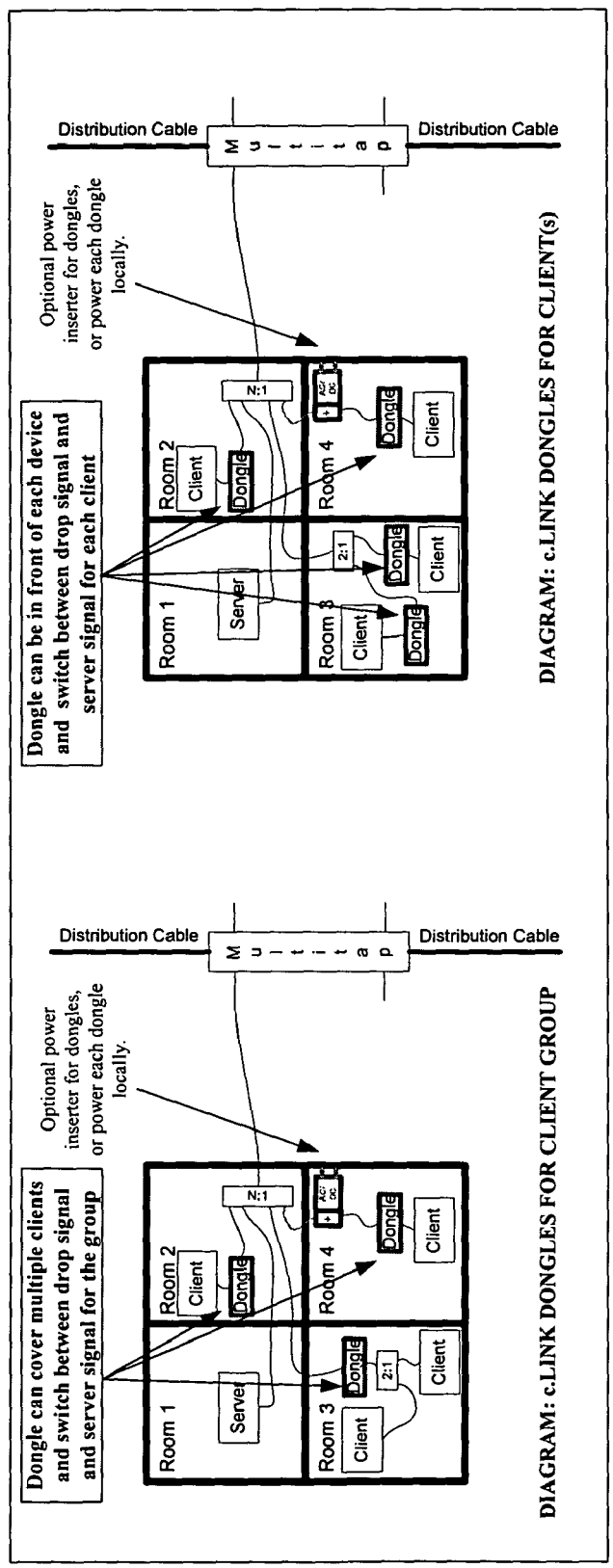
FIG. 16 shows a configuration using a converting dongle used with client devices.

FIG. 16 shows a configuration using a converting dongle used with client devices.

c.LINK Operational Advantages c.LINK solves the operational and installation issues since it:

transmits between 860 and 1600 MHz so it co-exists with existing services
automatically selects its own FDM channel within 860-1600 MHz so that it does not interfere with neighboring homes using c.LINK
uses 42 MHz BW so its power spectral density is much lower than Legacy
does additional processing allowing more than 10 dB higher transmit power levels than a Legacy waveform without disturbing other TVs, VCRs and home devices
works backwards through existing splitters (directional couplers) and cabling for all in-home architectures
can be placed at any node and communicate with any node so there are no restrictions on placement, movement or splitters in the path of the server
supports a link budget for 25 dB from POE to node without amplification so that the existing POE splitter can remain untouched In order to support 40 Mbps 256 QAM Legacy, which requires a SNR of 28 dB, c.LINK would operate with QPSK and require a SNR=6 dB. This 22 dB advantage, when combined with the more than 10 dB advantage in other processing, gives an overwhelming 32 dB link budget advantage over Legacy.

A c.LINK dongle solves all of the problems found with other methods, and is a simple subscriber install, but has a higher cost if there are many legacy clients.

c.LINK Dongle

Figure 17:
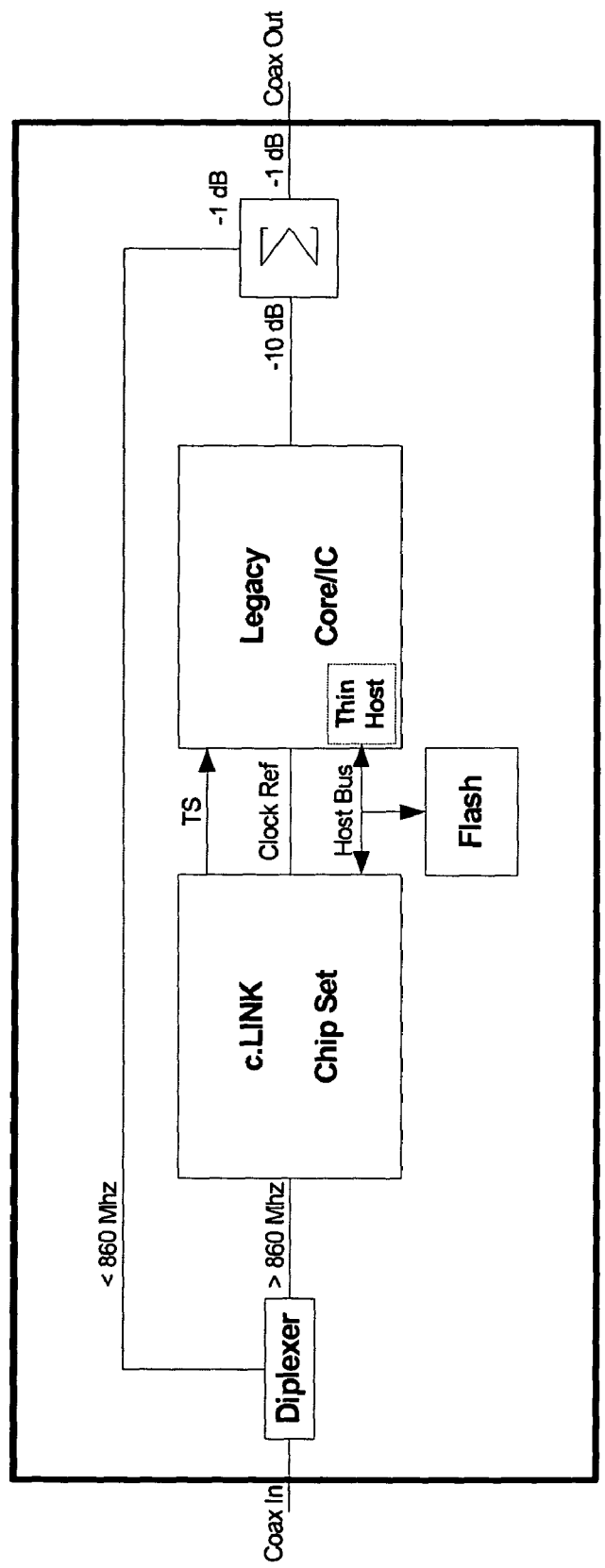
FIGS. 17 and 18 show block diagrams of dongles for use with client devices.
Figure 18:
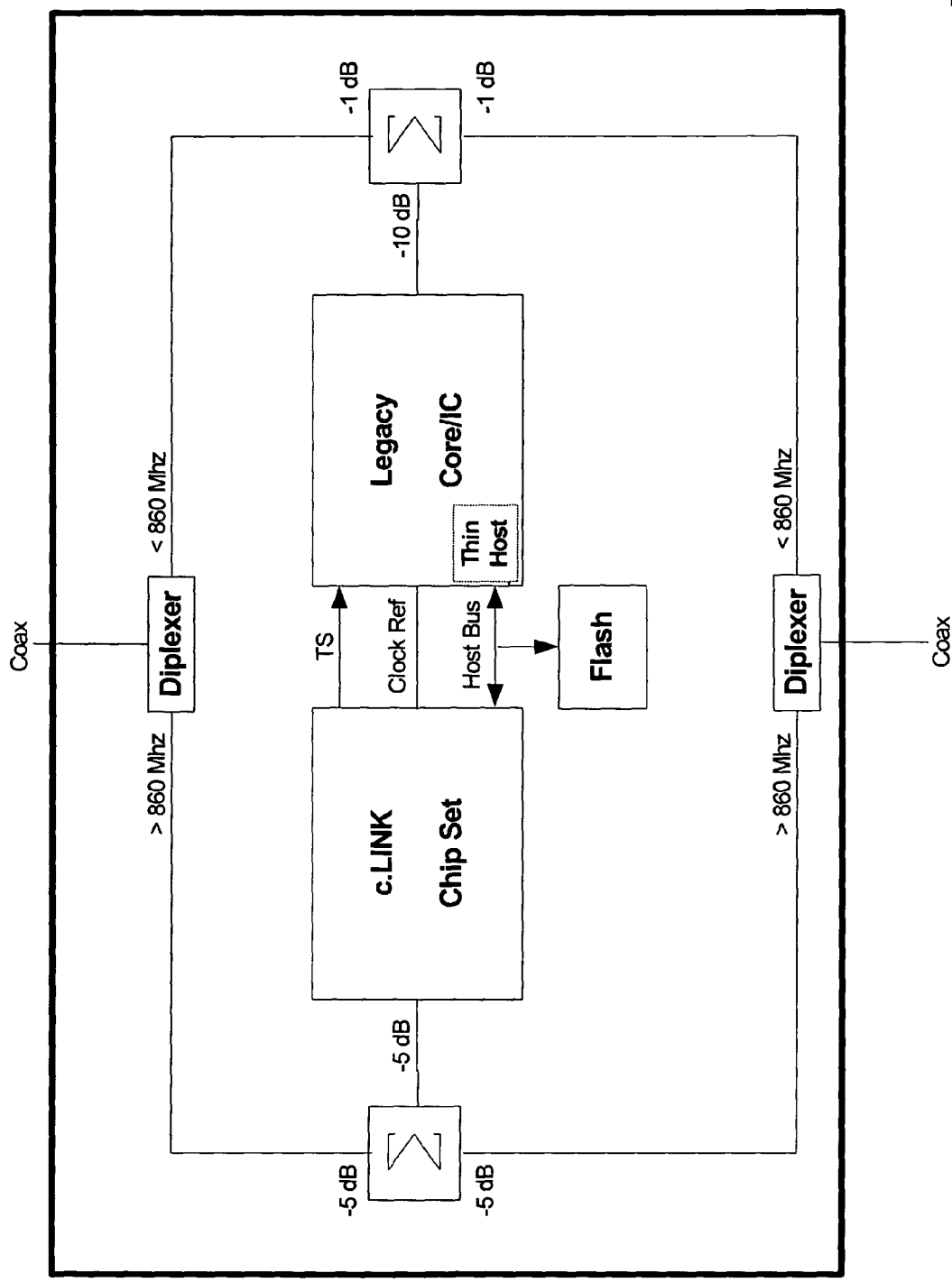

FIGS. 17 and 18 show block diagrams of dongles for use with client devices.

There are two approaches to the dongle. FIG. 17 dongle be must installed in a certain direction for input and output. FIG. 18 dongle can be installed either direction, but reduces signal power slightly for the existing services and c.LINK.

The Server sends MPEG TS over c.LINK to the dongle. The c.LINK chip outputs transport stream (TS) with clock, data and frame start to the Legacy Core/IC. The Legacy Core/IC puts the TS out on a standard Inband channel to the STB(s).

The STB(s) sends Aloha Upstream packets to the dongle. The Legacy Core/IC receives the Aloha packets and stores them in its FIFO and interrupts its Thin Host. The Thin Host accepts the Aloha packets from the Legacy Core/IC and then passes them through the standard host interface to the c.LINK chip. The c.LINK chipset transmits the Aloha packet back to the Server.

It is expected that the dongle would have Flash memory in it, although an EPROM would be able to be used if code were not going to be changed.

Recommended Solution

Comparison of Final Solutions

There are many approaches to distributing multi-media and control between the server and clients in the home. However, the choices distill to 3 workable solutions that are compared in the following table.

| Comparison Of Methods | | | |
|---|---|---|---|
| | New Cables To POE Server with Legacy IC No POE splitter change No Dongle | No New Cables Server with Legacy IC Active POE Splitter No Dongle | No New Cables/ Splitters Server with c.LINK IC No POE splitter change c.LINK to Legacy Dongle |
| New Cables Installed | Yes. Usually two new cables run from POE to server. | No. | No. |
| Total Installation | Professional install | Professional install | Subscriber install |
| Server Location | Fixed. Cannot move server (only box with HD and IP support) to other rooms. | Movable | Movable |
| Device Location Issue | Yes. Must run cables from Server. Server at interior wall or other location is problematic for install time and aesthetics to subscriber. | Yes. May not have physical room to put an active POE splitter where the current splitter is. | No. |
| Splitters in Server Branch | Must be installed backwards. Consumer adoption issues. May require professional installer each time. | Yes. Subscriber install. | Yes. Subscriber install. |
| Server Incremental TMCost | +$5 + c.LINK | +$5 + c.LINK | 0 + c.LINK |
| Dongle TMCost | 0 | 0 | +$23/client |
| Wall Mount Power Supply | 0 | +$4 | +$4 (or at each client) |
| POE Splitter TMCost | 0 | +$16 | 0 |
| New Cables | +$10 to +$40 | 0 | 0 |

-continued

Comparison Of Methods

| | New Cables To POE Server with Legacy IC No POE splitter change No Dongle | No New Cables Server with Legacy IC Active POE Splitter No Dongle | No New Cables/ Splitters Server with c.LINK IC No POE splitter change c.LINK to Legacy Dongle |
|---|---|---|---|
| Cost | | | |
| Install Cost | +$30 to +$200 | +$30 to +$200 | 0 |
| Total Cost | $45 to $245 + c.LINK | $55 to $225 + c.LINK | $27 + c.LINK |
| Truck Roll | Permanent Truck Roll Install Model | Permanent Truck Roll Install Model | No Truck Roll Model Subscriber easy install. |
| Failure, or Subscriber Bump, Takes Down Everything In Whole House | No | Yes. Wall mount power supply or POE splitter failures take down all services. | No |
| Interference To Other Homes | No. Solved. | No. Solved. | No. Solved. |
| Power Control For Adjacent Channel Power Ratio | NA | Complicated. Other signals up at 1 Ghz can upset power control. Need narrow BPF and dedicated frequency band. Still, solution would be to add a comm.-link between server and POE splitter. TMCost adder $1. | NA |

The number of STB clients in a home is a key factor in determining which method to use. The following table shows the distribution of STBs per home. The average number of STBs per Legacy home is 1.5, however new installations are closer to a 2 STB/home average today.

| Number of Legacy STBs in the Home | Percentage of Homes |
|---|---|
| 1 | 54% |
| 2 | 31% |
| 3 | 7% |
| 4 | 2.5% |

For a single STB home, the choice is clearly a dongle due its ease of installation as well as consumer adoption and satisfaction. For two STBs, it becomes less obvious since it is a comparison of the cost of multiple dongles versus installation and POE splitter costs. For two bedrooms, costs are about even for a simple POE install that is considered incremental since the installer is already there. The POE install can be more complicated, or the reason for a truck roll, making it a much higher cost. Taking into consideration cost and the advantages to the subscriber, the dongle still makes more sense for a two STB home. Once a solution is the correct one for 85% of homes, it does not make sense to have another method available even for many STB houses.

Summary Recommendation

The MSO should be given two choices for a solution:

Professional install: Converting POE Device & Server with c.LINK+Legacy

Subscriber install: c.LINK+Legacy dongle & Server with c.LINK+Legacy

Figure 19:
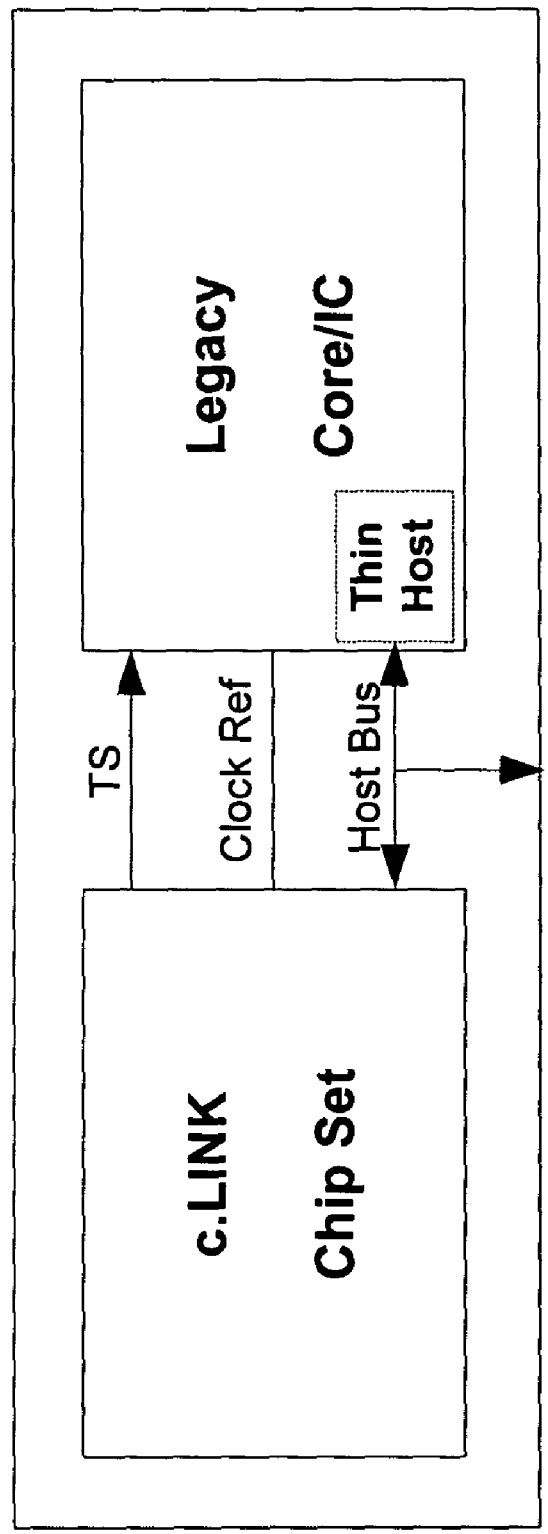
FIG. 19 shows a block diagram of an integrated circuit for converting a new protocol to a legacy protocol.

FIG. 19 shows a block diagram of an integrated circuit for converting a new protocol to a legacy protocol.

Figure 20:
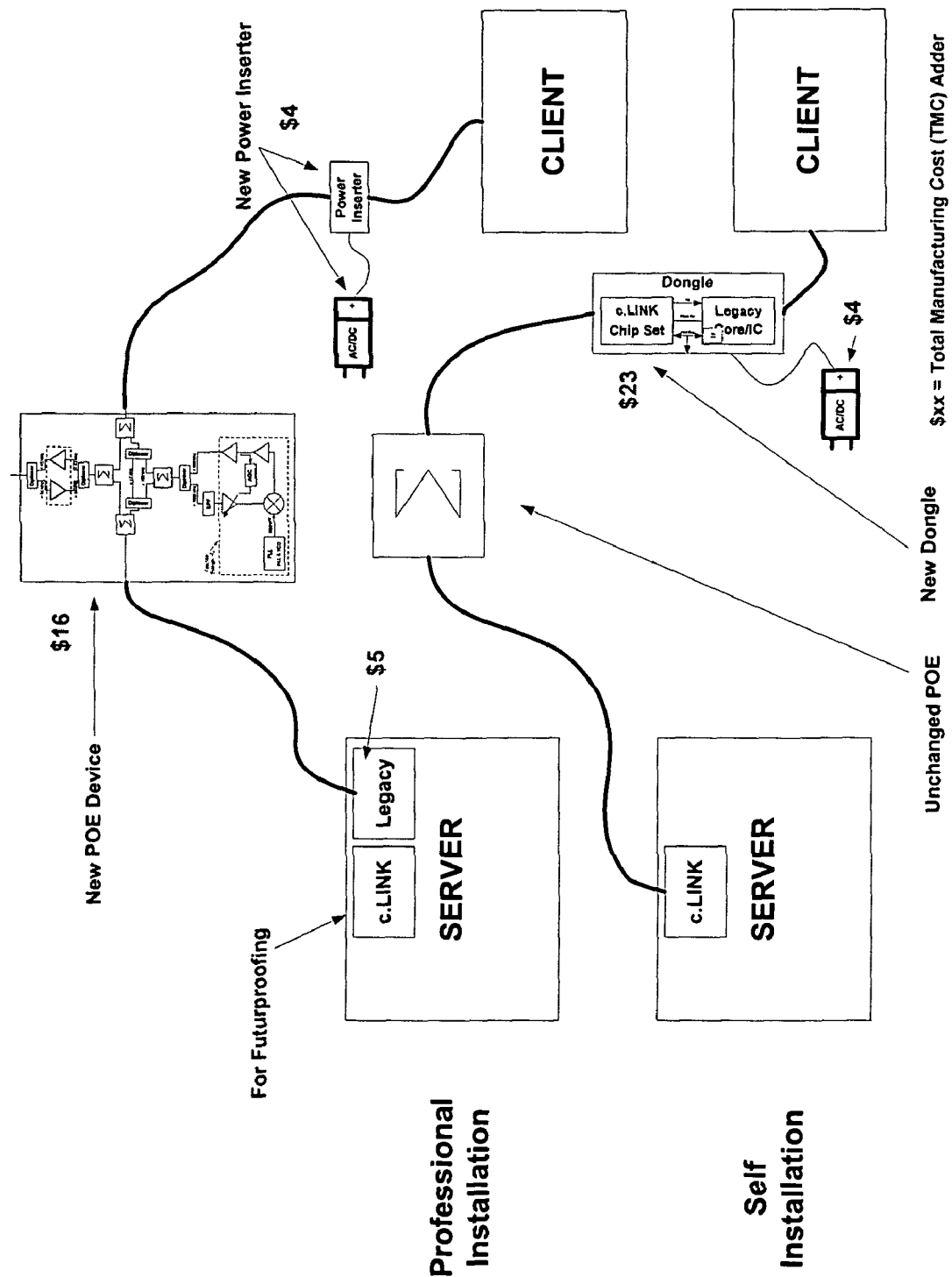
FIG. 20 shows an example of a single client house with each of the final two preferred solutions.

FIG. 20 shows an example of a single client house with each of the final two preferred solutions. The costs ($) shown there are for total manufacturing cost (TMC), not just ICs.

IC Implementation

Legacy Core/IC Implementation

Figure 21:
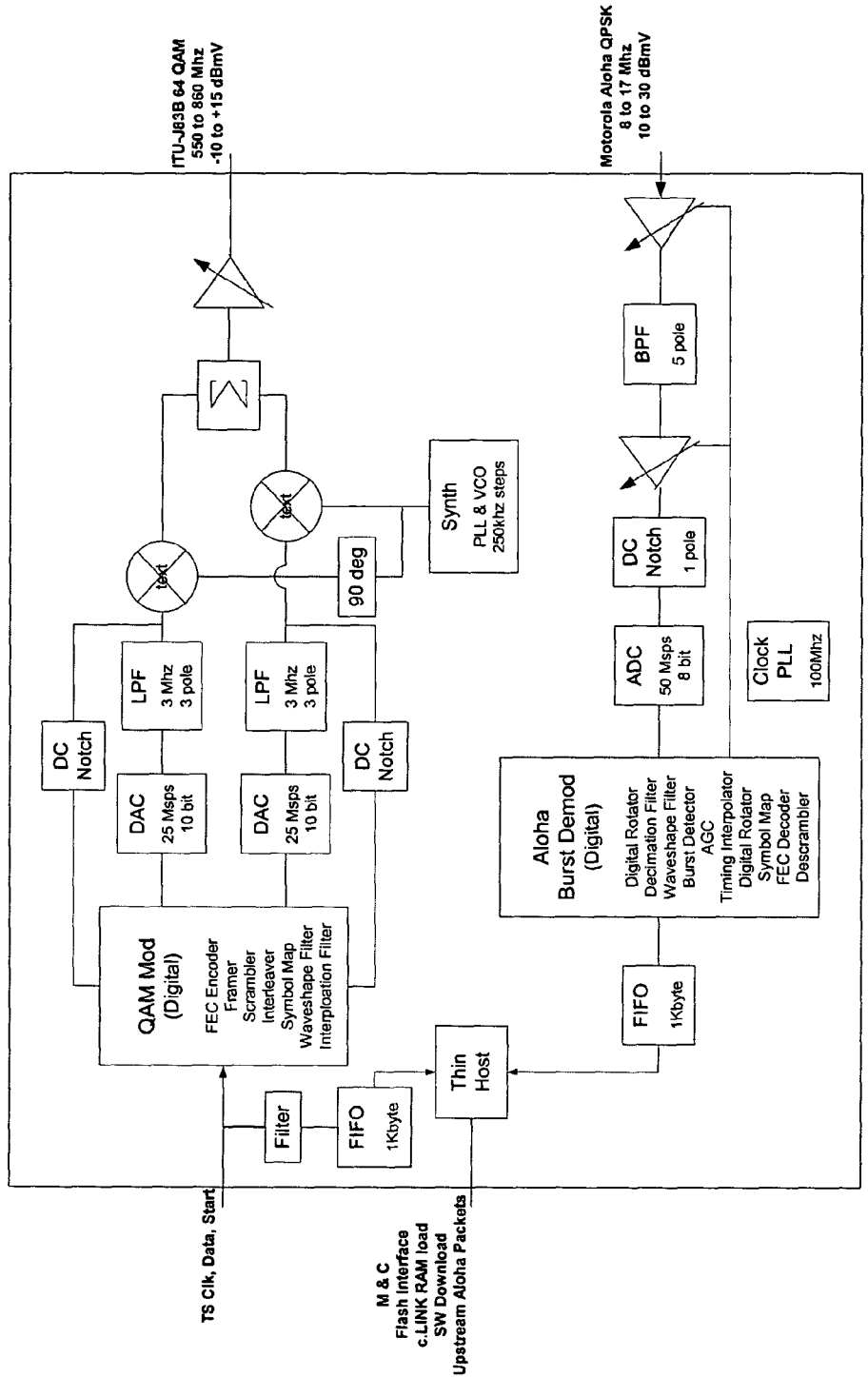
FIG. 21 shows a block diagram of a legacy core integrated circuit.

FIG. 21 shows a block diagram of a legacy core integrated circuit. From a MPEG transport stream (TS) clock, data and frame start signal, the Core generates an ITU-J83B compliant RF waveform between the frequencies of 750 and 860 MHz. From a Motorola Aloha upstream RF input between 8 and 17 MHz the Core extracts the packets and places them in a FIFO for the host.

Legacy Core/IC Inband Implementation

The Core inputs a TS, or partial TS, at the full ITU-J83B 64 QAM data rate or less. The Core expects clock, TS data and frame start signals. The data is FIFOed and pulled out at the ITU-J83B rate under PLL control to maintain an accurate ITU-J83B symbol rate and jitter. If there is not enough TS data, because the TS is slower than a full ITU-J83B rate, then the Core inserts null packets and re-timestamps the TS packets. The Inband digital processing does the full ITU-J83B processing for 64 QAM signaling, limited to the minimum interleaver depth of 8×16. It uses a variable interpolation filter from symbol rate to sample rate so that a fixed, unrelated, clock source or XTAL can be used.

The Core filters the TS input PIDs for the PID that brings remote M&C and software download from the Server. It stores these packets in a FIFO for the Thin Host to process.

The Core outputs an Inband signal level between −10 and +15 dBmV, as programmed by the host. The RF step size of the carrier is 250 KHz, which supports standard and incremental channel plans. The first adjacent channel energy is −46 dBC, with the energy in all other adjacent channels being >−53 dBC. These adjacent levels are more than sufficient for digital adjacent channels, and since the analog signals will normally be received at the TV>7 dB higher than the Inband signal, even a first adjacent analog channel will see <−53 dBC. In addition, since this signal will be output in the band 550 to 860 MHz it will typically have digital adjacent channels.

Quadrature upconversion is used so that there is not a second IF requiring a complicated or SAW filter. This minimizes pins, die size, external components and cost. In addition, there are not multiple LO and IF frequencies that can create significant difficulties due to crosstalk and interference within an IC or on a PCB. The quadrature balance is controlled so that the image rejection is >38 dB. The image is directly underneath the Inband signal so that no adjacent channels are affected, while the Inband signal only suffers <0.1 dB loss in 64 QAM mode.

Legacy Core/IC Aloha Upstream Implementation

The Core inputs an RF Aloha Upstream within signal levels of −8 to 15 dBmV. The signal is AGC amplified, filtered and input to the ADC for direct conversion. The Core then de-rotates, decimation filters, and matched filters the signal. It uses a variable decimation rate filter from sample rate to symbol rate so that a fixed, unrelated clock or XTAL can be used. Burst detection is performed estimating timing, phase and power level. A constant false alarm rate (CFAR) algorithm is used for robust detection and false alarm rates. The signal is then adjusted for timing, phase and level followed by symbol de-mapping and FEC decoding. The resulting packet is put into a FIFO and the Thin Host is interrupted that a packet is available. The interrupt conditioning is programmable. The host can then send the packet on to the c.LINK chip set for transmission back to the Server over c.LINK async service.

The Aloha protocol processing and medium access control (MAC) are done by the server host in layers above the Core.

Legacy Core/IC Thin Host

The Thin Host is an 8051 or lesser microcontroller. It is not used for processing of the Inband or Aloha Upstream, but is there to eliminate the need for an external host when the end product is a dongle or repeater. The Thin Host does the following tasks in a dongle or repeater:

Configure the c.LINK chip set and Legacy Core/IC.
Manage Flash IC
Load the c.LINK program RAM from Flash
Manage software remote upgrade/download to Flash
Set up and handle PID filtering on the TS input to get packets that are destined for the Thin Host. This is how the Server talks to the Dongle, including software upgrade/download.
Forward Aloha Upstream packets to c.LINK for transmission to the Server
Emulate uP bus master to c.LINK IC The Thin Host interface is a reduced pin count of the ISA (Intel x86) or Motorola 68331 uP bus. It also has a mode where it can talk directly to a Flash IC on this same bus.

At power up, the Thin Host will read from Flash and write it into the c.LINK IC and Legacy Core/IC to program all configuration registers. The Thin Host will also fill the c.LINK IC instruction RAM and then remove reset causing the c.LINK IC to run its own code and operate independently.

The Thin Host manages software upgrade/download (remote download) to the Flash. The Server can receive a code update over the cable plant from the cable headend. The Server can then send the new dongle/repeater software code through the Inband channel. The c.LINK IC will pass the TS packets with software upgrade PID through to the Legacy IC, which contains filtering to recognize and locally store the software code upgrade packets in a FIFO. The Thin Host performs CRC checks and writes the upgrade code to the Flash. When the upgrade/download is complete, the Thin Host checks a full CRC and manages the process of using the new or previous version of code stored in the Flash. The software upgrade/download can occur during operation.

The Thin Host monitors the Aloha Upstream FIFO and when an upstream packet is received, it generates a request to the c.LINK IC to transmit the packet, and sends the packet to the c.LINK IC.

All communication from the Legacy Core/IC to the c.LINK IC, including RAM loading and configuration and forwarding of Aloha Upstream packets, is done through the Legacy IC's ISA/68331 uP bus master emulator.

Legacy Core/IC General Implementation

This Legacy Core/IC can be integrated into another IC, such as the c.LINK IC, or can be a stand-alone IC.

The IC is implemented in standard 0.18 u CMOS process at TSMC, with a few standard process adders for RF compatibility. It is designed for very high volume, low cost applications.

POE Splitter IC Implementation

The converting POE device can be reduced in cost by making an IC to do the mixing and AGC for client to server communications.

Figure 22:
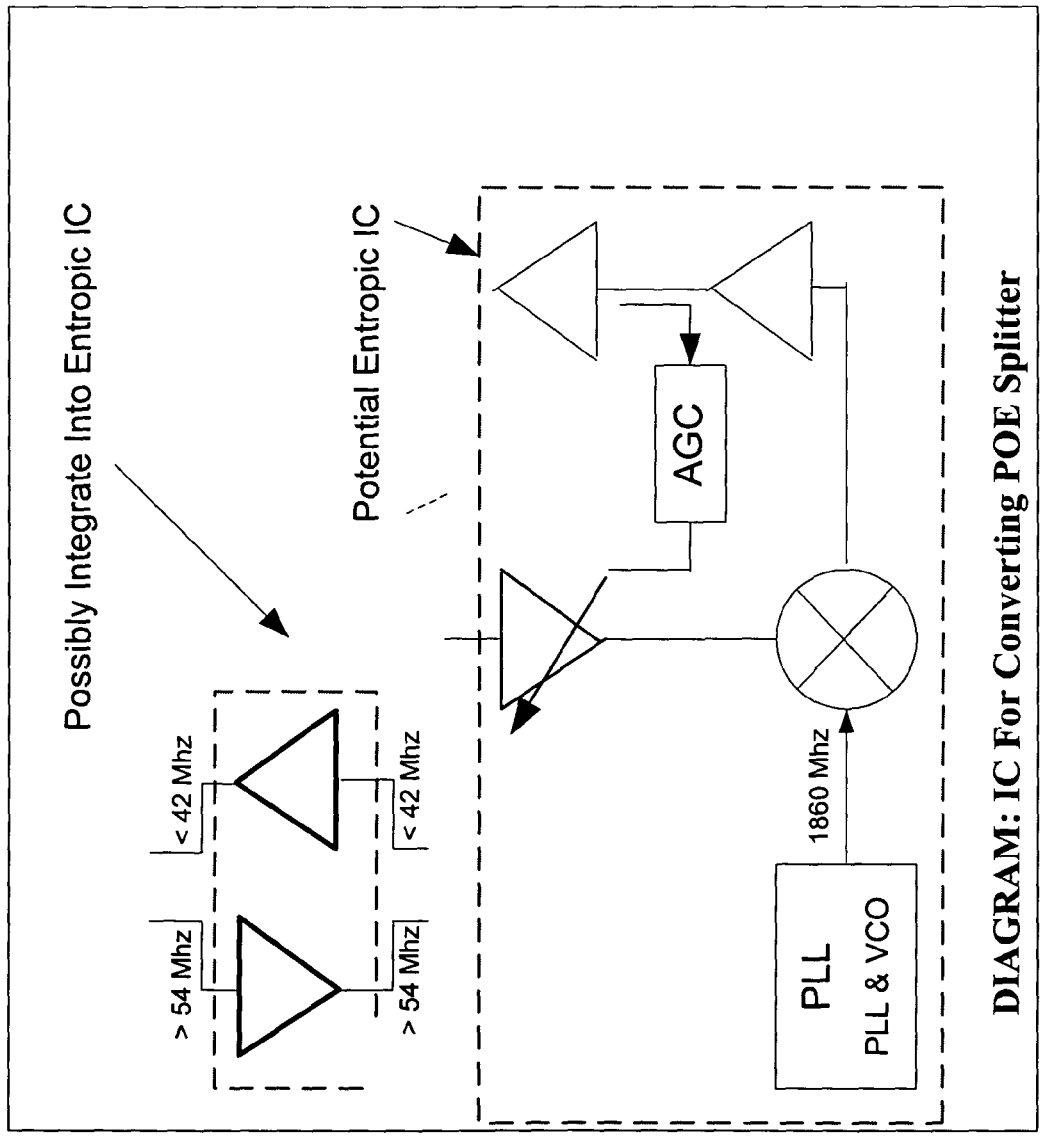
FIG. 22 shows a block diagram of the converting POE Core/IC (Core).

FIG. 22 shows a block diagram of the converting POE Core/IC (Core).

Appendix: Home Cabling Architectures

Figure 23:
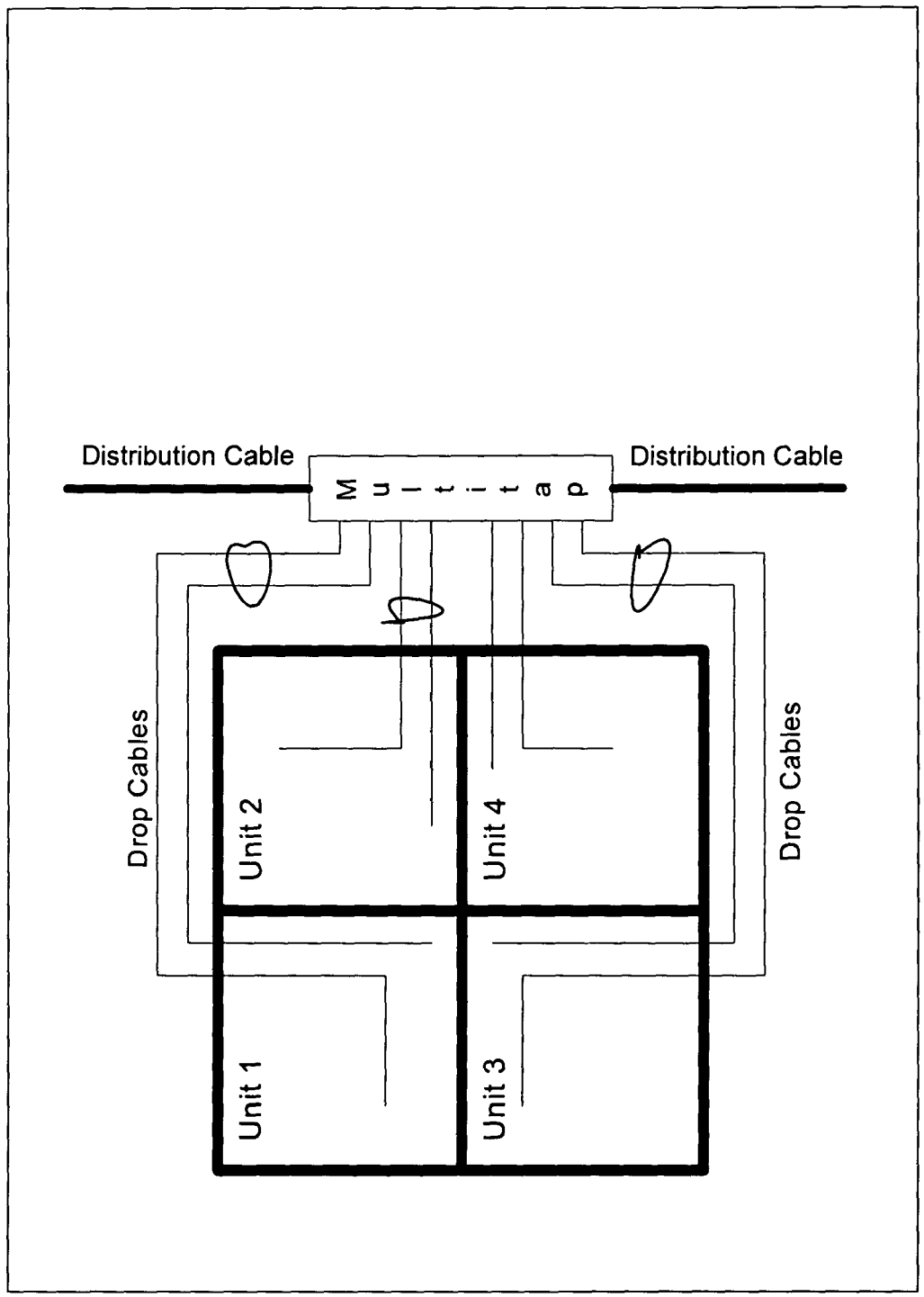
FIG. 23 shows a condominium or apartment building that does not follow the normal single drop line configuration

FIG. 23 shows a condominium or apartment building that does not follow the normal single drop line configuration, dropping to "access point" or "point of entry (POE)" or "ground block" followed by in-unit splitter. The cables going to a single unit are supposed to be gathered together with a zip-tie but may not be. This architecture is typically called "home run". There is no single POE and a splitter would need to be added near the multi-tap, in order to generate a single POE.

A second, similar architecture uses common splitters instead of more expensive multi-taps. There are no guidelines and it is up to the individual installer and building he is at to select the approach taken. The cables going to a single unit are supposed to be gathered together with a zip-tie but may not be. Note that the cables to a single unit do not always come from the same splitter. This architecture is also typically called "home run". Again, there may not be a single POE and a splitter must be added near the external splitter(s), in order to generate a single POE.

Figure 24:
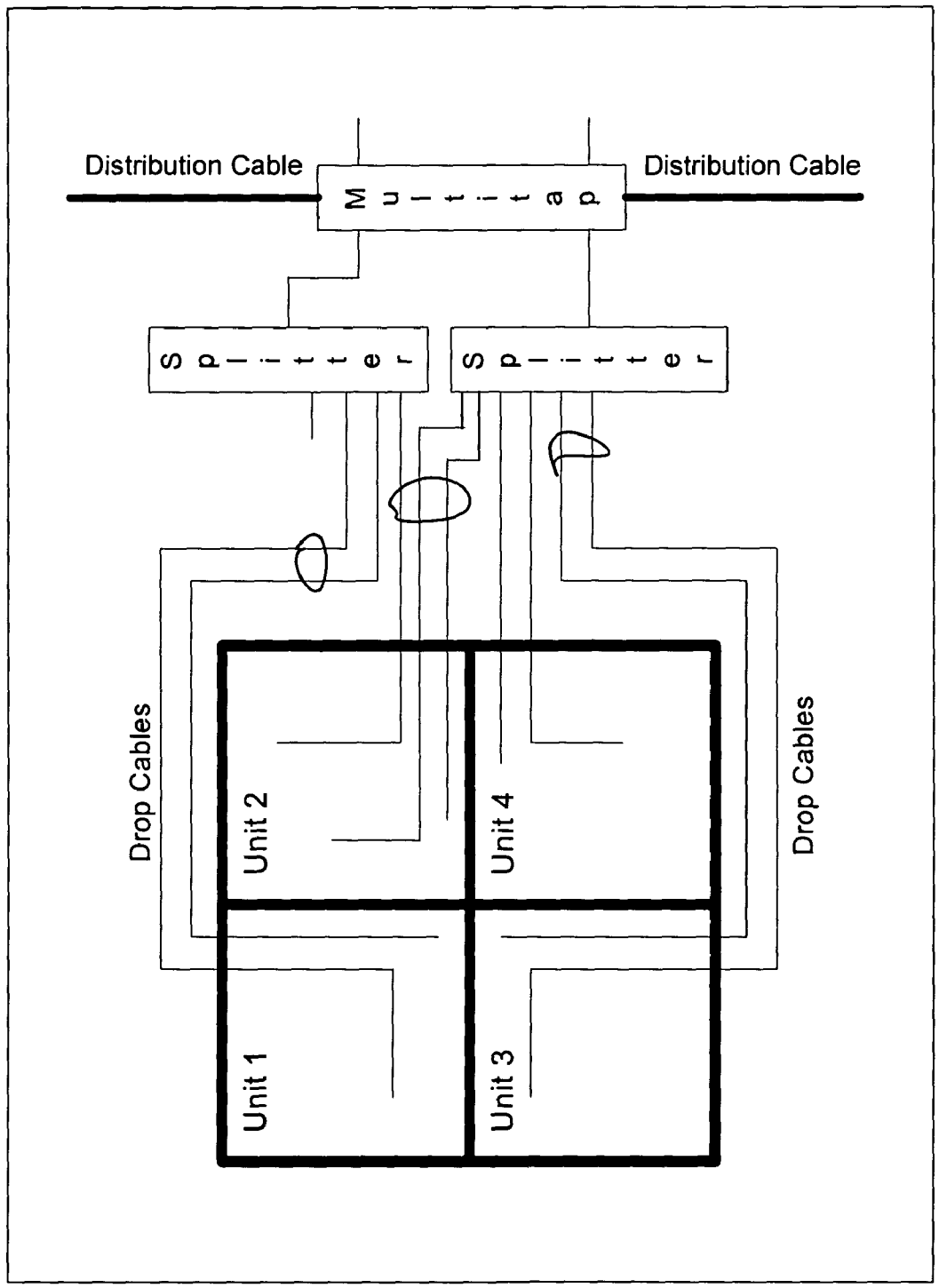
FIG. 24 shows an architecture that uses common splitter instead of multi-taps.

FIG. 24 shows an architecture that uses common splitter instead of multi-taps.

In single-family homes, condominiums and apartments another architecture called "loop" is common. The splitters may be behind the outlet plates in the walls. Sometimes installers will just put a splice at one of the outlet plates instead of a splitter if there is not going to be a TV connected at that location.

Prior to around 1990, many homes and units were done with loop since this is less expensive than home run. Particularly if the builder was/is the one installing the cabling then loop was/is used to save cost. In an effort to keep track and charge people for multiple rooms of cable TV watching the architecture switched to home run for homes and units around 1990. Even though MSOs later quit charging for additional analog CATV rooms in the mid 1990s, they continued doing home run wiring for its better performance. Still, some units are done with loop even today.

Figure 25:
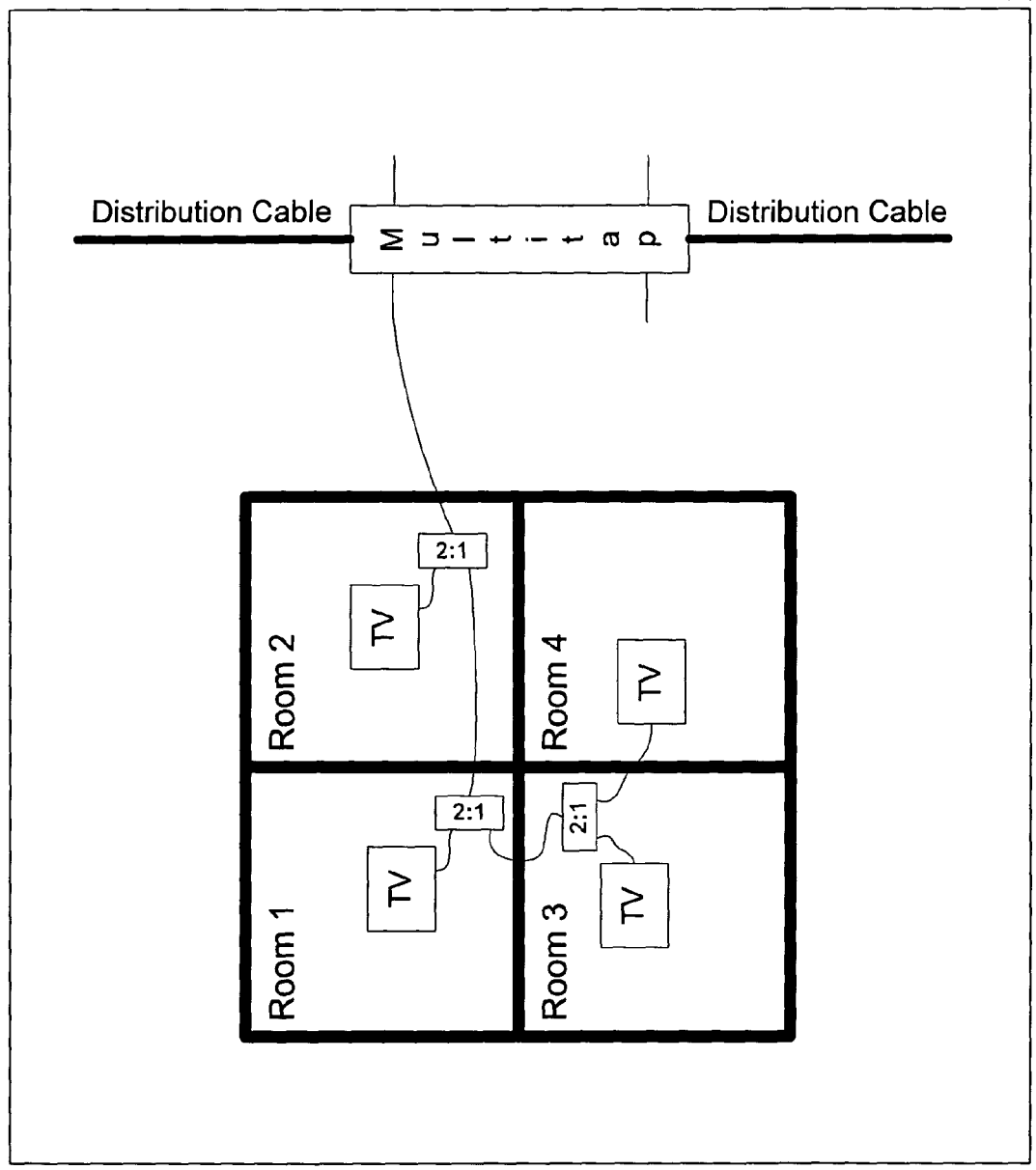
FIG. 25 shows a loop wiring configuration for multiple rooms.

FIG. 25 shows a loop wiring configuration for multiple rooms.

Figure 26:
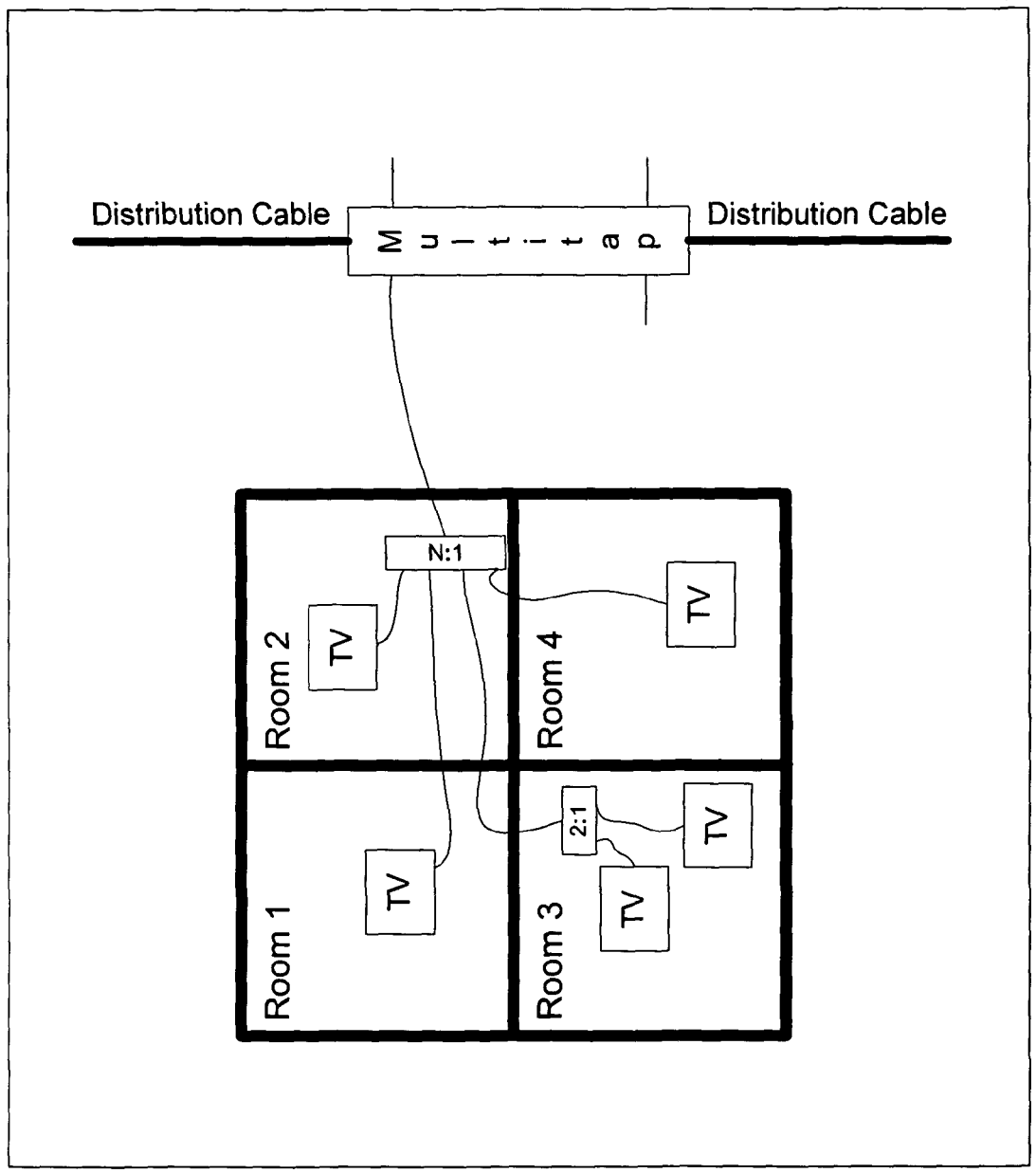
FIGS. 26 and 27 show a "home run" configuration.
Figure 27:
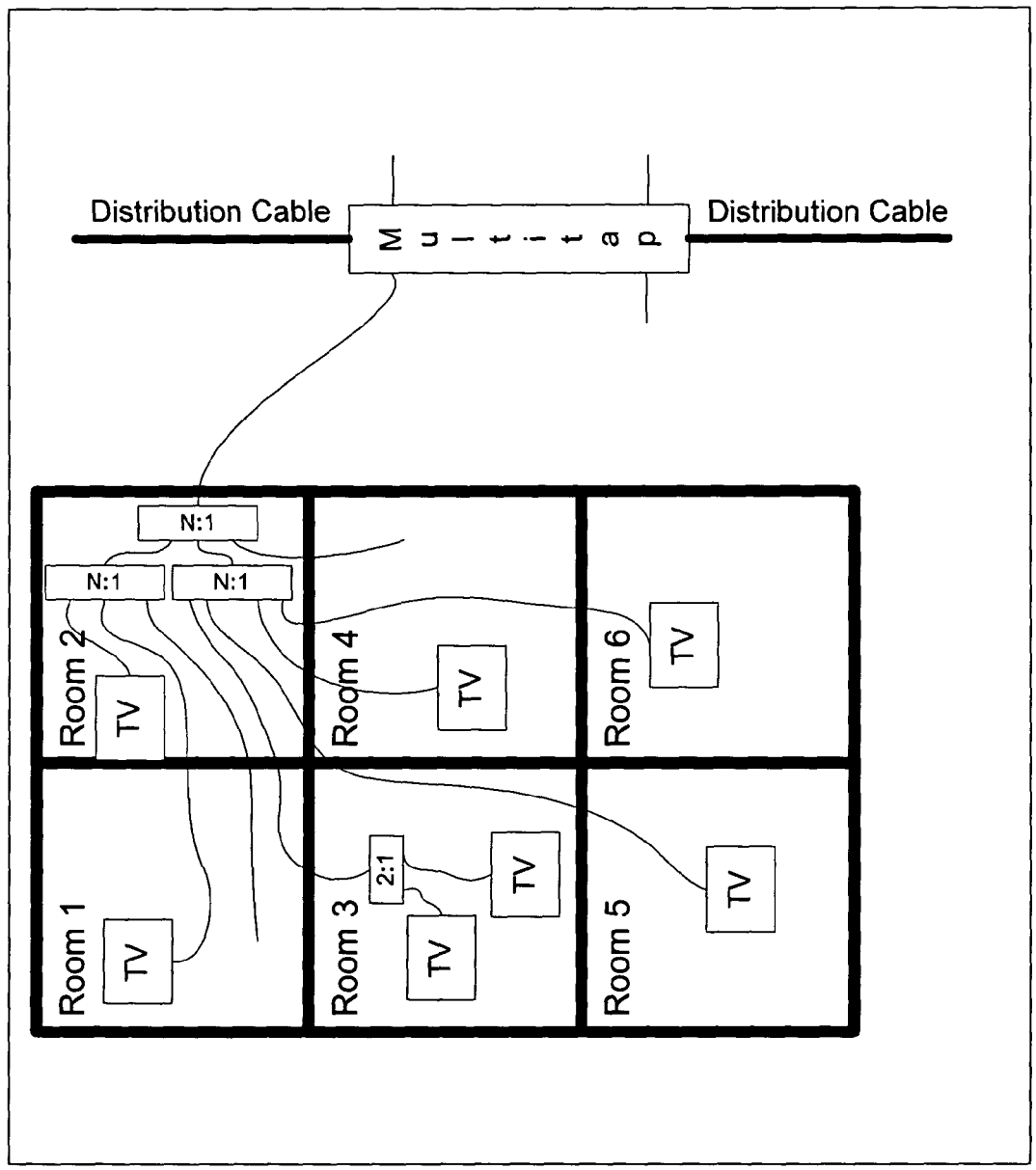
Figure 28:
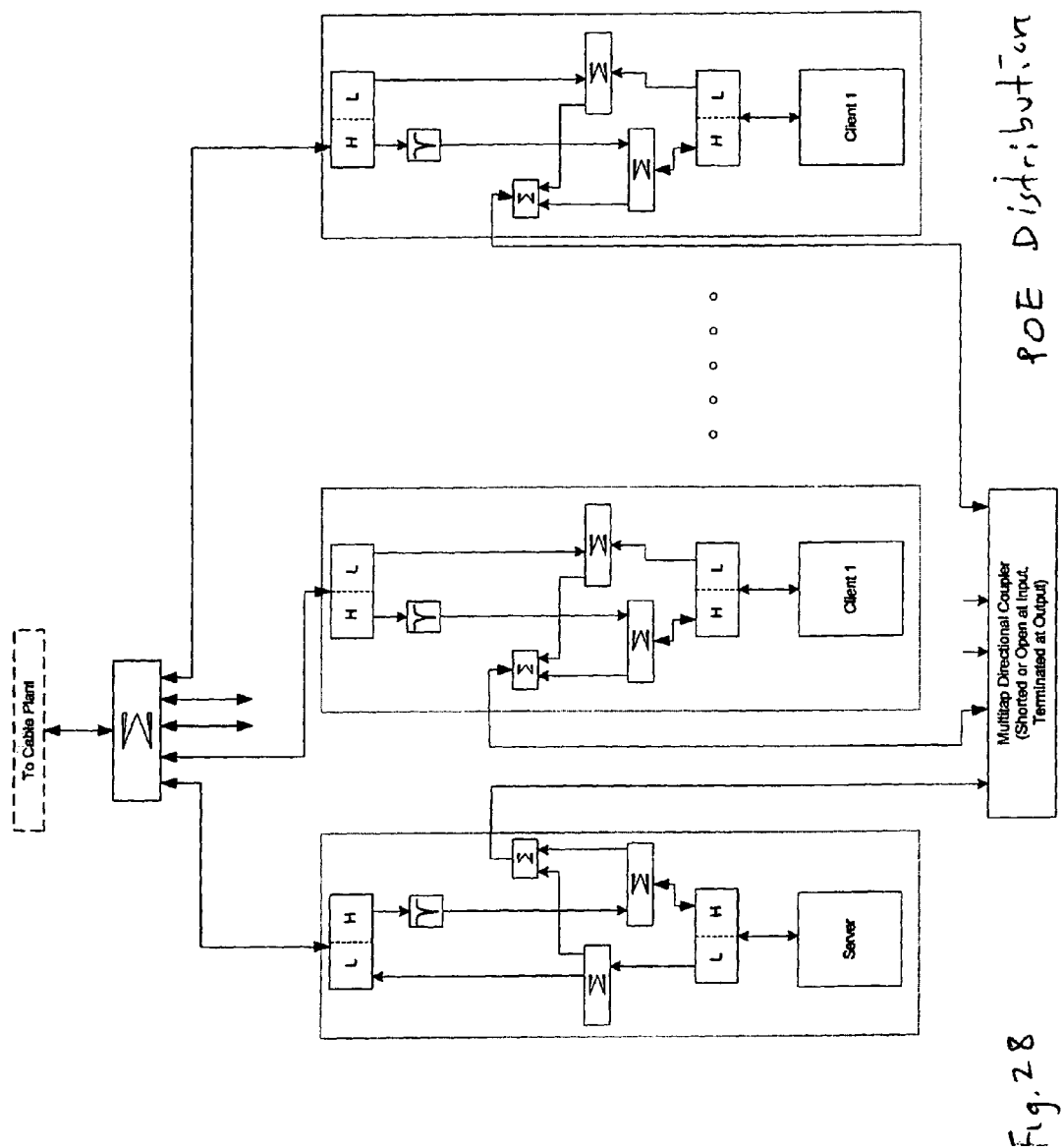
Figure 30:
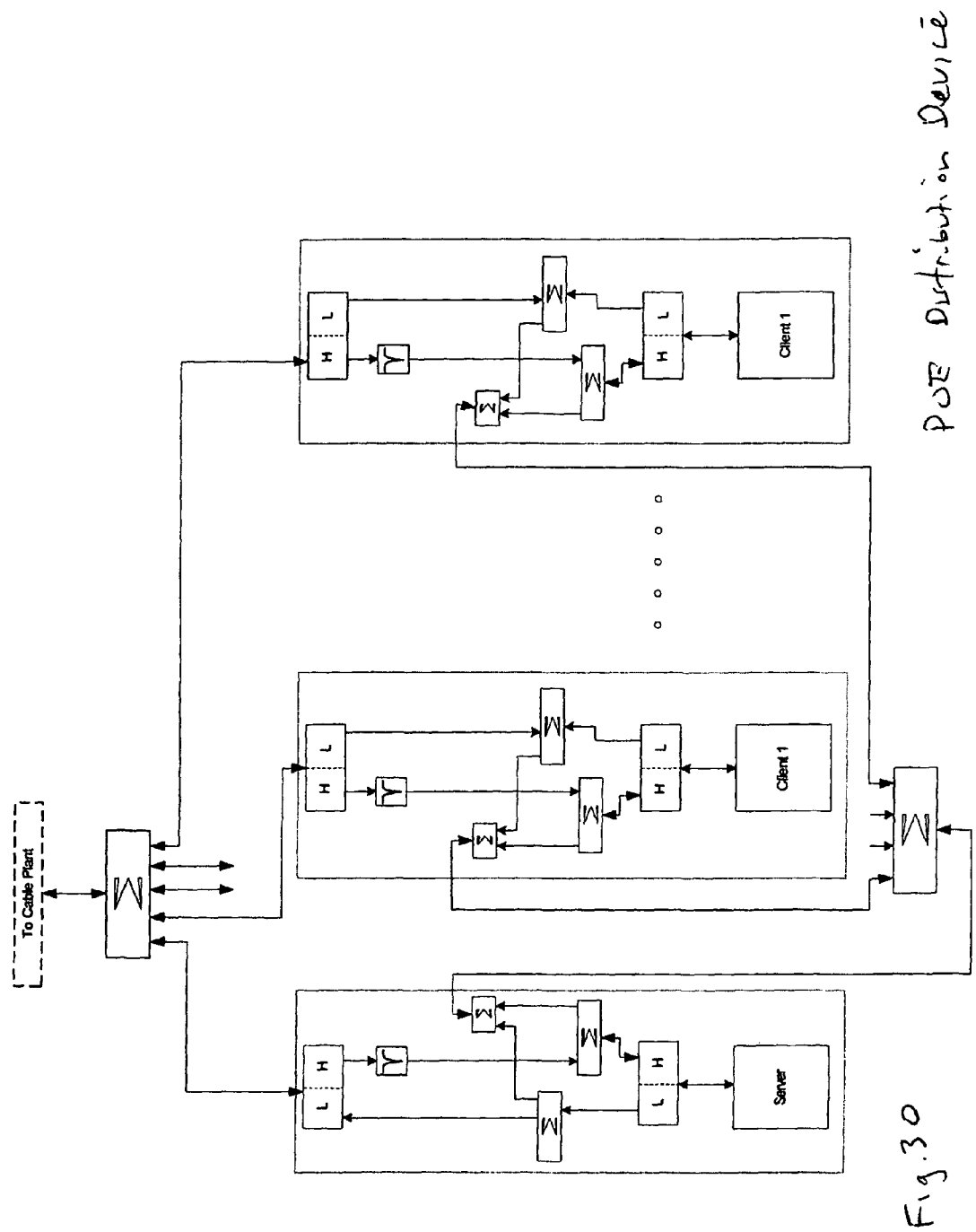
Figure 31:
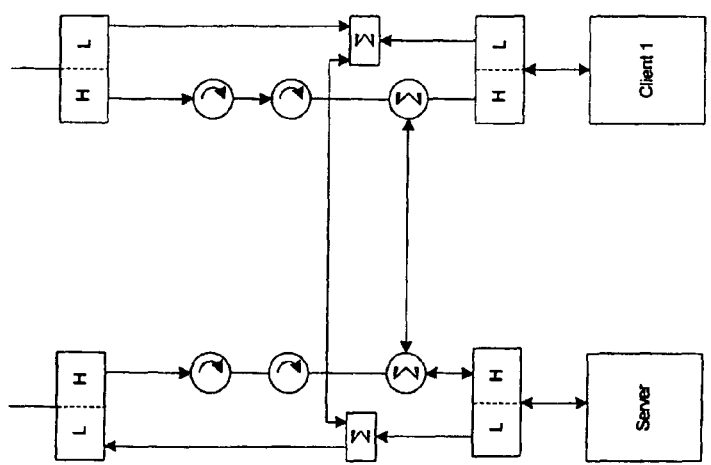

FIGS. 26 and 27 show a "home run" configuration. In most single-family homes, condominiums and apartments the architecture called "home run" with a single drop line is used. The POE splitter may be replaced with several splitters when more cable runs are desired in the home. The subscriber might add his own splitters, such as in room 3, in order to add another device.

FIGS. 28 through 31 show block diagrams of several point of entry distribution devices.

A number configurations are possible with variations of server capability, STB capability, and network architecture:

Configuration 1: A server, for in-home placement and use, that has the ability to communicate with legacy digital STBs or other legacy digital devices (altogether called LDs), by using the same, or a subset of the same, digital waveform(s) as the LD(s) expect from a service provider, and using segments or all of the in-home coaxial infrastructure (coax and splitters, etc.) to communicate between server and LD(s), and using a device to isolate the segments or all of the home coax infrastructure used by the server for in-home communications from the distribution coax infrastructure or other home coax infrastructures.

C2: C1+ that the server is capable of communicating with "new client(s)", where new client(s) use a non-legacy waveform such as 802.11, c.LINK, Ethernet, 1394. Such new client communication can be simultaneous to LD communication.

C3: C1+ that the server is also capable of communicating analog (NTSC, PAL, JAPAN) to regular TVs and VCRs. Such analog communication can be simultaneous to LD communication.

C4: C2 and C3 together (analog, new client and LD)

C5: C1+ where the server communicates non-legacy waveform and converting dongle(s) are placed between the server and LD(s) that converts to legacy waveform. There can be a dongle in front of each LD, or a dongle can service multiple LDs.

C6: C2+ where the server communicates non-legacy waveform and converting dongle(s) are placed between the server and LD(s) that converts to legacy waveform. There can be a dongle in front of each LD, or a dongle can service multiple LDs.

C7: C3+ where the server communicates non-legacy waveform and converting dongle(s) are placed between the server and LD(s) that converts to legacy waveform. There can be a dongle in front of each LD, or a dongle can service multiple LDs.

C8: C6+C7 Similar to C4 but where the server communicates with the non-legacy waveform and converting dongles are place at each LD.

C9: Incorporation function into server that for PVR, DVD, other storage, or relays (with or without delay) broadcast content from service provider C100: A modification to an LD that enables it to communicate with either an in-home server or its normal service provider based on user input such as remote control.

C101: C100+ The LD selects communications with the in-home server by tuning to a specific frequency, and still selects communications with its service provider by tuning to frequencies used with its service provider.

C200: A coaxial in-home network using splitter(s) that are reversed in direction from normal connection in an in-home coaxial infrastructure, where such network enables an in-home server to communicate with LD(s) and client(s) located in the same branch off of the point of entry splitter as the server, and the server to communicate with the service provider, both without going from output to output of splitter.

C201: C200+ communications from client(s) or LD(s), which are in the same branch off of the point of entry splitter as the server, to service provider are relayed through the server and not directly communicated to the service provider.

C300: A LD that is made aware of a service coming from an in-home server, where the LD tunes to a unique frequency to communicate with the in-home server, and the LD may also communicate and get services from the service operator by tuning to its normal service frequencies.

C400: Server knows or is told which LDs are part of its network, or authenticated for the server, and the server uses address filtering or other identification of said LDs to determine whether or not the LDs are part of its network, whether or not to respond, and how to respond. Return channel signaling from LDs in other homes or on a different network can be ignored or replied to that they are not of this servers network. And such server does not require a device at the point of entry to isolate it from the distribution plant and other homes at the return channel frequency(s).

What is claimed is:

1. A network for distributing video programming and data comprising:
   first in-home coaxial wiring segment;
   at least one splitter having at least a first input and at least a first and second outputs, the first input connected to the first in-home coaxial wiring segment;
   a second in-home coaxial wiring segment connected to the second output;
   a plurality of legacy set top boxes connected to the first in-home wiring segment, the legacy set top boxes adapted to receive video programming and control information in a legacy format;
   an isolation device coupled to the first in-home coaxial wiring segment and placed at the point of entry to isolate signals to segments of the first in-home coaxial wiring segment; and
   a media server located in a home connected to one in-home wiring segment, the server comprising
   at least one tuner,
   an inband demodulator,
   an out of band demodulator,
   an MPEG multiplexer, and
   a QAM modulator;
   wherein the media server receives video programming from at least one in-band channel, receives and demodulates control information from an out of band channel, the video programming and control information having an alternate format and wherein the media server creates an MPEG transport stream comprising at least one video program and the control information, the MPEG transport stream being created in a legacy format for transmission to the legacy set top boxes and wherein the media server transmits to non-legacy set top boxes video program and control information in the alternate format received by the media server.

2. The network of claim 1 wherein the isolation device is a frequency selective and directional power splitter that couples a predetermined frequency band and blocks a predetermined frequency band.

* * * * *